US012683417B2

(12) United States Patent
Murakami et al.

(10) Patent No.: US 12,683,417 B2
(45) Date of Patent: Jul. 14, 2026

(54) ELECTRICAL APPARATUS AND APPARATUS SYSTEM

(71) Applicant: MAKITA CORPORATION, Anjo (JP)

(72) Inventors: Junichi Murakami, Anjo (JP); Hideyuki Taga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 745 days.

(21) Appl. No.: 18/019,121

(22) PCT Filed: Aug. 6, 2021

(86) PCT No.: PCT/JP2021/029391
§ 371 (c)(1),
(2) Date: Feb. 1, 2023

(87) PCT Pub. No.: WO2022/044785
PCT Pub. Date: Mar. 3, 2022

(65) Prior Publication Data
US 2023/0318329 A1 Oct. 5, 2023

(30) Foreign Application Priority Data

Aug. 25, 2020 (JP) ................................. 2020-142074

(51) Int. Cl.
*H02J 7/70* (2026.01)
*H01M 50/247* (2021.01)
(Continued)

(52) U.S. Cl.
CPC ........... *H02J 7/751* (2026.01); *H01M 50/296* (2021.01); *H01M 50/543* (2021.01); *H01M 50/247* (2021.01)

(58) Field of Classification Search
CPC .... H02J 7/0045; H02J 7/0063; H01M 50/296; H01M 50/543; H01M 50/247; H01M 10/44; H01M 50/503; Y02E 60/10
(Continued)

(56) References Cited

U.S. PATENT DOCUMENTS 6,181,032 B1 * 1/2001 Marshall ................... B25F 3/00
200/321
8,163,414 B2 * 4/2012 Wan ..................... H01M 50/213
429/96
(Continued)

FOREIGN PATENT DOCUMENTS

JP 2002-008607 A 1/2002
JP 2008-512833 A 4/2008
(Continued)

OTHER PUBLICATIONS

JP2019030951A Machine Translation (Year: 2019).*
(Continued)

*Primary Examiner* — M Baye Diao
(74) *Attorney, Agent, or Firm* — Oliff PLC

(57) ABSTRACT

A battery pack includes a battery-side terminal and a housing. The housing includes a groove defined in a vicinity of the battery-side terminal. The electrical apparatus includes a body case; and a hook attached to the body case and configured to be engaged with the groove of the battery pack. The battery pack is fixed to the electrical apparatus by the hook being engaged with the groove.

19 Claims, 28 Drawing Sheets

(51) Int. Cl.
    *H01M 50/296*     (2021.01)
    *H01M 50/543*     (2021.01)

(58) Field of Classification Search
    USPC ......................................................... 320/107
    See application file for complete search history.

(56) References Cited

U.S. PATENT DOCUMENTS

| | | | | |
|---|---|---|---|---|
| 8,400,108 | B2 * | 3/2013 | Powell ....................... | H02J 7/70 |
| | | | | 320/113 |
| 8,652,667 | B2 * | 2/2014 | Kim ...................... | H01M 10/42 |
| | | | | 429/57 |
| 11,923,522 | B2 * | 3/2024 | Bae ................... | H01M 10/6235 |
| 2008/0248376 | A1 | 10/2008 | Rejman et al. | |
| 2010/0081044 | A1 | 4/2010 | Rejman et al. | |
| 2010/0221591 | A1 * | 9/2010 | Roskamp ............ | H01M 50/271 |
| | | | | 429/99 |
| 2013/0216885 | A1 * | 8/2013 | Kawatani ................ | B60L 53/80 |
| | | | | 429/100 |
| 2016/0345714 | A1 | 12/2016 | Yamaoka et al. | |
| 2020/0212414 | A1 * | 7/2020 | Takeuchi .................. | B25F 5/02 |

FOREIGN PATENT DOCUMENTS

| | | | | |
|---|---|---|---|---|
| JP | 2019-30951 | A | 2/2019 | |
| JP | 2019046588 | A * | 3/2019 | ............... B25F 5/02 |
| JP | 2020-089221 | A | 6/2020 | |
| JP | 6953883 | B2 * | 10/2021 | ............... B25H 3/02 |

OTHER PUBLICATIONS

Oct. 26, 2021 International Search Report issued in International Patent Application No. PCT/JP2021/029391.

Oct. 26, 2021 Written Opinion of the International Searching Authority issued in International Patent Application No. PCT/JP2021/029391.

Apr. 22, 2025 Office Action issued in Japanese Patent Application No. 2024-029951.

\* cited by examiner

Apparatus System <u>2</u>

212a
(212b)

210a
(210b)

230a          202

74

200          214a
(214b)

230c(230d)          220

218a(218b)          252

16          216a
(216b)

44

72

76

70

10

20          34          A          90

UP

FRONT ←——→ REAR

DOWN

UP

FRONT ⟷ REAR

DOWN

FRONT

RIGHT ← → LEFT

REAR (Second Embodiment)

(Second Embodiment)

ELECTRICAL APPARATUS AND APPARATUS SYSTEM

TECHNICAL FIELD

The technique disclosed herein relates to an electrical apparatus and an apparatus system.

BACKGROUND ART

Japanese Patent Application Publication No. 2008-512833 describes an electrical apparatus to which a battery pack is to be detachably attached. The battery pack includes a battery-side terminal and a housing, and the housing includes a groove defined at a position away from the battery-side terminal. The electrical apparatus includes a body case and a lock mechanism attached to the body case and configured to engage with the groove of the battery pack. By the lock mechanism engaging with the groove, the battery pack is fixed to the electrical apparatus.

SUMMARY OF INVENTION

Technical Problem

In the electrical apparatus of Japanese Patent Application Publication No. 2008-512833, the groove is defined at a position relatively away from the battery-side terminal. In this case, the battery side terminal may adversely move under the state where a hook of the electrical apparatus is engaged with the groove of the battery pack and the battery pack is thereby fixed to the electrical apparatus.

The present disclosure provides a technique capable of suppressing adverse movement of a battery-side terminal under the state where the battery pack is fixed to the electrical apparatus.

Solution to Technical Problem

The disclosure discloses an electrical apparatus to which a battery pack is to be detachably attached. The battery pack may include a battery-side terminal and a housing, wherein the housing may include a groove defined in a vicinity of the battery-side terminal. The electrical apparatus may comprise: a body case; and a hook attached to the body case and configured to engage with the groove of the battery pack. The battery pack may be fixed to the electrical apparatus by the hook engaging with the groove.

According to the above configuration, the hook engages with the groove defined in the vicinity of the battery-side terminal. By virtue of the groove being defined in the vicinity of the battery-side terminal, the battery side terminal is firmly fixed under the state where the battery pack is fixed to the electrical apparatus. Accordingly, it is possible to suppress adverse movement of the battery-side terminal under the state where the battery pack is fixed to the electrical apparatus.

Further, the disclosure discloses an apparatus system comprising: a battery pack and an electrical apparatus to which the battery pack is to be detachably attached. The battery pack may comprise: a battery-side terminal; and a housing, wherein the housing may include a groove defined in a vicinity of the battery side terminal. The electrical apparatus may comprise: a body case; and a hook attached to the body case and configured to engage with the groove of the battery pack, wherein the battery pack may be fixed to the electrical apparatus by the hook engaging with the groove.

According to the above configuration, the hook engages with the groove defined in the vicinity of the battery-side terminal. By virtue of the groove being defined in the vicinity of the battery-side terminal, the battery-side terminal is firmly fixed under the state where the battery pack is fixed to the electrical apparatus. Accordingly, it is possible to suppress adverse movement of the battery-side terminal under the state where the battery pack is fixed to the electrical apparatus.

DESCRIPTION OF EMBODIMENTS

Figure 1:
FIG. 1 is a block diagram of an apparatus system 2 of a first embodiment.

In one or more embodiments, an electrical apparatus to which a battery pack is to be detachably attached is disclosed. The battery pack may include a battery-side terminal and a housing, wherein the housing may include a groove defined in a vicinity of the battery-side terminal. The electrical apparatus may comprise: a body case; and a hook attached to the body case and configured to engage with the groove of the battery pack. The battery pack may be fixed to the electrical apparatus by the hook engaging with the groove.

In one or more embodiments, the electrical apparatus may further comprise a terminal unit including an apparatus-side terminal corresponding to the battery-side terminal, wherein the hook may be attached to the terminal unit outside the body case.

It is not desirable for water to enter the electrical apparatus. When the hook is attached to the terminal unit inside the body case, an opening for the hook to extend from within the body case to the outside needs to be defined in the body case. In this case, water may enter the electrical apparatus through the opening. According to the aforementioned configuration, by virtue of the hook being attached to the terminal unit outside the body case, it is not necessary to define an opening in the body case for the hook to extend from within the body case to the outside thereof. Accordingly, entry of water into the electrical apparatus can be suppressed.

In one or more embodiments, the electrical apparatus may further comprise a biasing member disposed between the terminal unit and the hook, wherein the biasing member may be configured to bias the hook from an unlock position to a lock position. Under a state where the hook is positioned in the unlock position, the battery pack is not fixed to the electrical apparatus, and under a state where the hook is positioned in the lock position, the battery pack is fixed to the electrical apparatus.

According to the above configuration, after the battery pack is attached to the electrical apparatus, the state in which the battery pack is fixed to the electrical apparatus is maintained without a worker's operation on the hook. Accordingly, worker convenience can be enhanced.

In one or more embodiments, one of the terminal unit and the hook may comprise a protruding portion protruding in an axial direction, and the other of the terminal unit and the hook may comprise a recess configured to slidably retain the protruding portion, wherein the hook may be attached to the terminal unit such that the hook is rotatable about an axis of the protruding portion.

According to the aforementioned configuration, it is possible to switch between a state in which the battery pack is fixed to the electrical apparatus and a state in which the battery is not fixed to the electrical apparatus with a relatively simple configuration.

In one or more embodiments, the body case may comprise an upper wall to which an apparatus-side terminal corresponding to the battery-side terminal is attached, a bottom wall, and a standing portion extending upward from the upper wall, wherein the standing portion includes a rail extending in a sliding direction of the battery pack. An upper end of the standing portion may be positioned higher than an upper end of the hook.

According to the above configuration, when the electrical apparatus falls in the state where the upper end of the standing portion and the upper end of the hook are directed downward, the standing portion comes into contact with the ground. Thus, when the electrical apparatus falls, the hook can be suppressed from coming into contact with the ground and getting damaged.

In one or more embodiments, the electrical apparatus may be a charger.

When the electrical apparatus is a charger, the battery pack needs to be fixed to the electrical apparatus while the battery pack is being charged. According to the aforementioned configuration, by the virtue of the hook engaging with the groove, the battery pack can be fixed to the charger. Thus, the battery pack can be fixed to the charger while the battery pack being charged.

In one or more embodiments, the battery pack may further include a terminal cover configured to be detachably attached to the housing. The housing may include a first housing surface facing the electrical apparatus and a terminal interface portion recessed inward than the first housing surface. The terminal interface portion may include the battery-side terminal, the groove and a cover attachment portion for attaching the terminal cover to the terminal interface portion. Under a state where the terminal cover is not attached to the terminal interface portion, the battery pack may be fixed to the electrical apparatus by the hook engaging with the groove defined in the terminal interface portion.

According to the above configuration, as compared to the configuration in which one of the groove and the cover attachment portion is not disposed at the terminal interface portion, the battery pack can be downsized and the electrical apparatus to which the battery pack is to be attached can also be downsized.

In one or more embodiments, the terminal interface portion may comprise a first interface surface recessed inward than the first housing surface and orthogonal to a sliding direction of the battery pack, and a second interface surface extending in the sliding direction and connecting the first housing surface and the first interface surface. The cover attachment portion may comprise a second protruding portion protruding into the terminal interface portion from the second interface surface. The groove may be defined between the second protruding portion and the first interface surface.

According to the above configuration, the battery pack can be fixed to the electrical apparatus and the terminal cover can be attached to the housing of the battery pack by using the groove defined between the second protruding portion and the first interface surface.

In one or more embodiments, an apparatus system comprising a battery pack and an electrical apparatus to which the battery pack is to be detachably attached is disclosed. The battery pack may comprise: a battery-side terminal; and a housing, wherein the housing may include a groove defined in a vicinity of the battery side terminal, the electrical apparatus may comprise: a body case; and a hook attached to the body case and configured to engage with the groove of the battery pack, wherein the battery pack may be fixed to the electrical apparatus by the hook engaging with the groove.

In one or more embodiments, the battery pack may further comprise: a terminal cover configured to be detachably attached to the housing. The housing may comprise a first housing surface facing the electrical apparatus and a terminal interface portion recessed inward than the first housing surface. The terminal interface portion may include the battery-side terminal, the groove and a cover attachment portion for attaching the terminal cover to the terminal interface portion.

According to the above configuration, as compared to the configuration in which one of the groove and the cover attachment portion is not disposed at the terminal interface portion, the battery pack can be downsized and the electrical apparatus to which the battery pack is to be attached can also be downsized.

In one or more embodiments, the terminal interface portion may comprise a first interface surface recessed inward than the first housing surface and orthogonal to a sliding direction of the battery pack, and a second interface surface extending in the sliding direction and connecting the first housing surface and the first interface surface. The cover attachment portion may comprise a second protruding portion protruding into the terminal interface portion from the second interface surface. The groove may be defined between the second protruding portion and the first interface surface.

According to the above configuration, the battery pack can be fixed to the electrical apparatus and the terminal cover can be attached to the housing of the battery pack by using the groove defined between the second protruding portion and the first interface surface.

First Embodiment

With reference to FIGS. 1 to 26, an apparatus system 2 of an embodiment will be described. As illustrated in FIG. 1 and FIG. 26, the apparatus system 2 includes a battery pack 200 and a charger 10 to which the battery pack 200 is to be detachably attached. The charger is a battery-related apparatus for charging the battery pack 200. The battery pack 200 is a power source to supply power to a working machine such as a lawn mower (not illustrated). The battery pack 200 is configured to be detachably attached to the working machine. The charger 10 is configured to charge the battery pack 200 in the state of being detached from the working machine. Hereafter, when the charger 10 of FIG. 2 is placed on a placement surface, a direction orthogonal to the placement surface will be referred to as an up-down direction, a direction orthogonal to the up-down direction will be referred to as a left-right direction, and a direction orthogonal to the up-down direction and the left-right direction will be referred to as a front-rear direction.

(Configuration of Charger 10)

Figure 2:
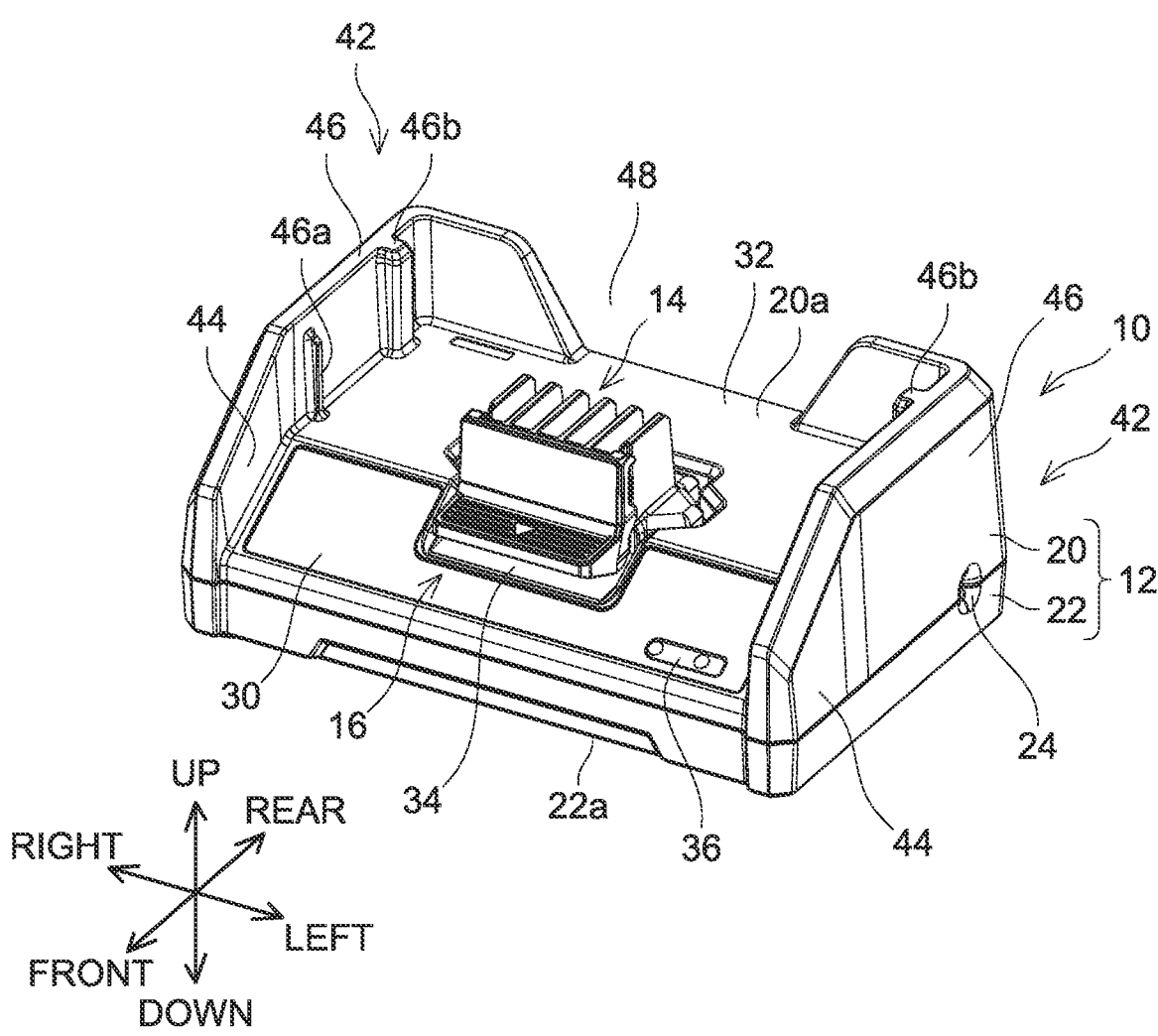
FIG. 2 is a perspective view of a charger 10 of the first embodiment viewed from the left upper front side.

With reference to FIG. 2 to FIG. 11, the charger 10 will be described. As illustrated in FIG. 2, the charger 10 includes a body case 12, a terminal unit 14 and hook 16. The body case 12 includes an upper case 20 and a lower case 22. The upper case 20 and the lower case 22 are fixed to each other by screws (not illustrated). When the charger 10 is placed on the placement surface, a bottom wall 22a of the lower case 22 faces the placement surface. A cable opening 24 defined by the upper case 20 and the lower case 22 being fixed to each other is provided at a lower portion of the left surface of the body case 12. The cable opening 24 is an opening to allow a power cable (not illustrated) to extend therethrough.

Figure 4:
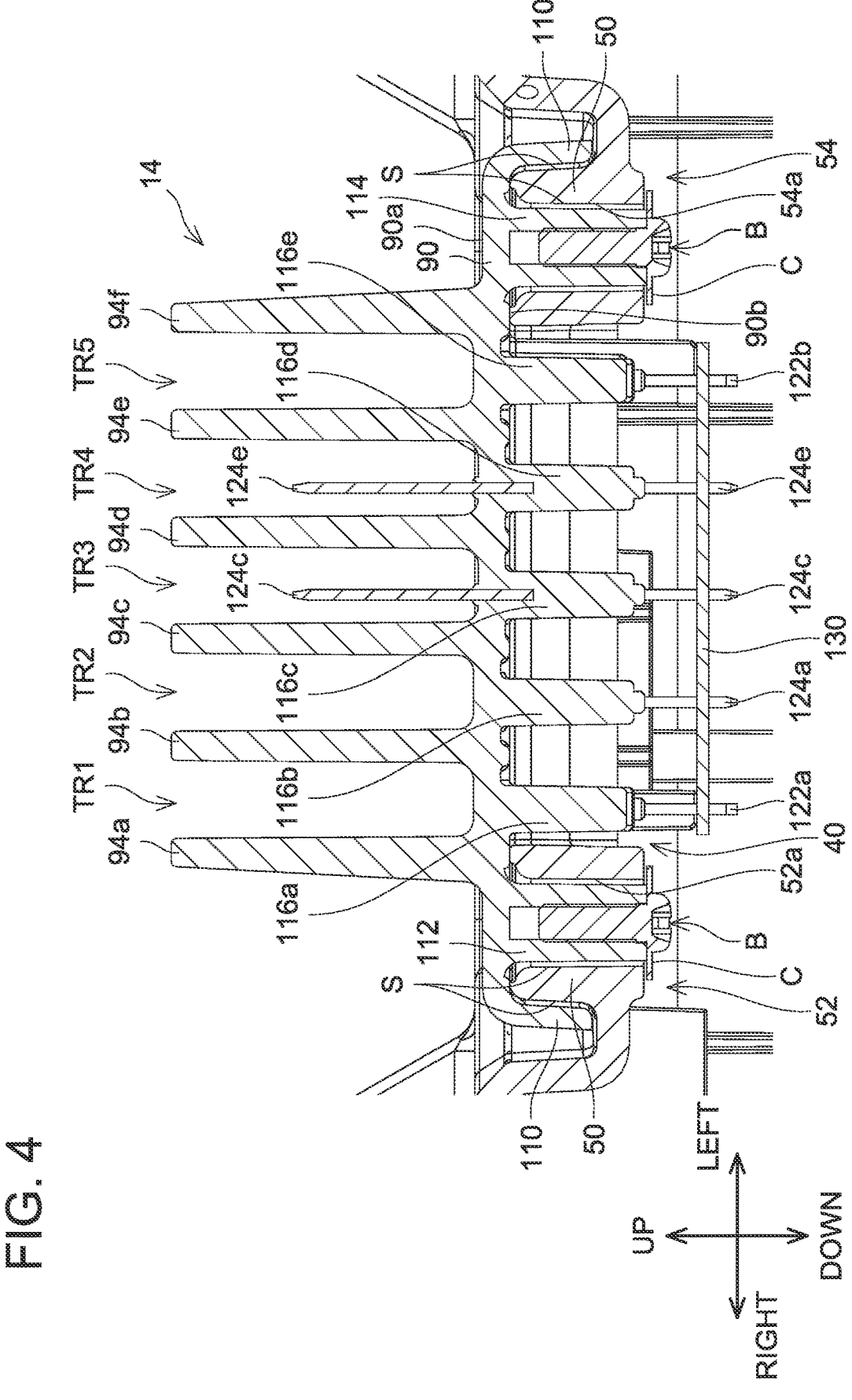
FIG. 4 is a cross-sectional view along a IV-IV line of FIG. 3.
Figure 5:
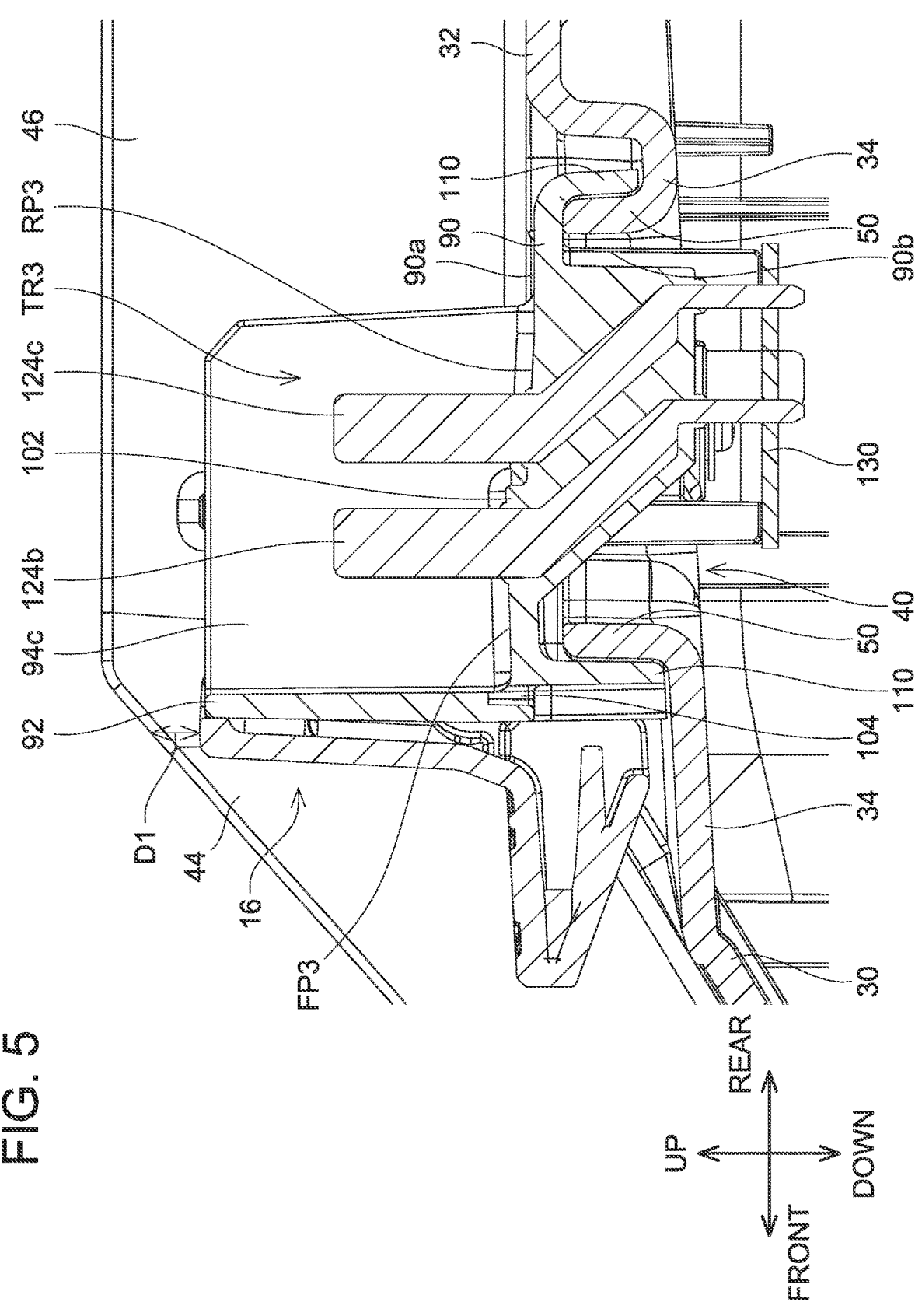
FIG. 5 is a cross-sectional view along a V-V line of FIG. 3.
Figure 7:
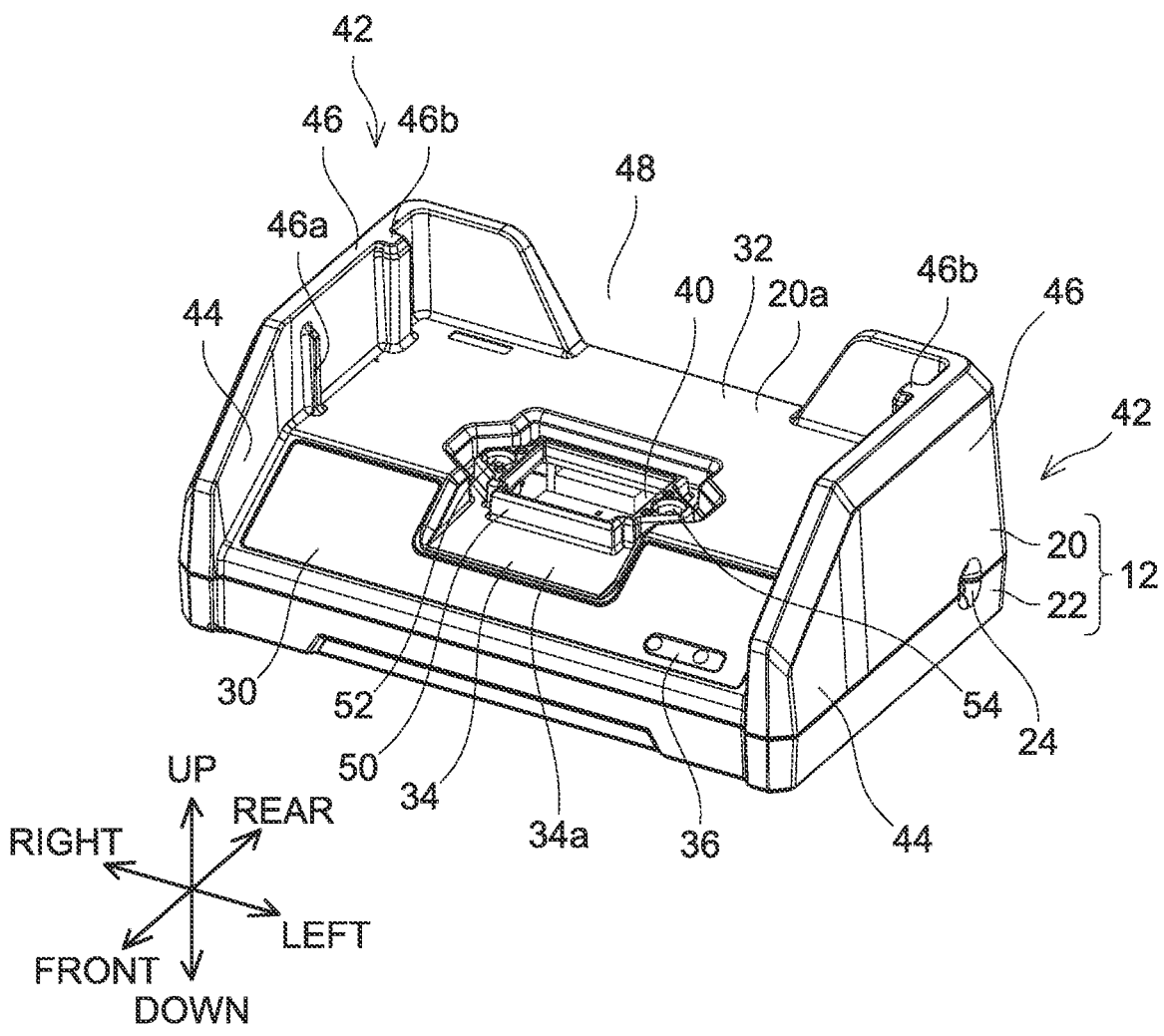
FIG. 7 is a perspective view of the charger 10 of the first embodiment with a terminal unit 14 detached, viewed from the left upper front side.

As illustrated in FIG. 7, an upper wall 20a of the upper case 20 is constituted of a front upper wall 30, a rear upper wall 32 and a center upper wall 34. The front upper wall 30 is disposed forward of the rear upper wall 32, and inclines such that its front side is inclined downward. A display 36 which shows a charge status of the battery pack 200 is disposed on the front upper wall 30. The center upper wall 34 is surrounded by the front upper wall 30 and the rear upper wall 32. The height of the center upper wall 34 is lower than the height of the rear upper wall 32. As illustrated in FIG. 5, the center upper wall 34 inclines such that its front side is inclined downward. An inclination angle of the center upper wall 34 is smaller than an inclination angle of the front upper wall 30. As illustrated in FIG. 7, an opening 40 is defined in the center upper wall 34. An upper rib 50 extending upward from an upper surface 34a of the center upper wall 34 is disposed around the opening 40. The upper rib 50 surrounds the entire periphery of the opening 40. Attachment portions 52, 54 are disposed on both sides of the upper rib 50. As illustrated in FIG. 4, the attachment portions 52, 54 include through holes 52a, 54a which penetrate the center upper wall 34 and the upper rib 50 in the up-down direction. The attachment portions 52, 54 are used to attach the terminal unit 14 to the upper case 20. As illustrated in FIG. 2, the terminal unit 14 covers the opening 40 from above.

Figure 3:
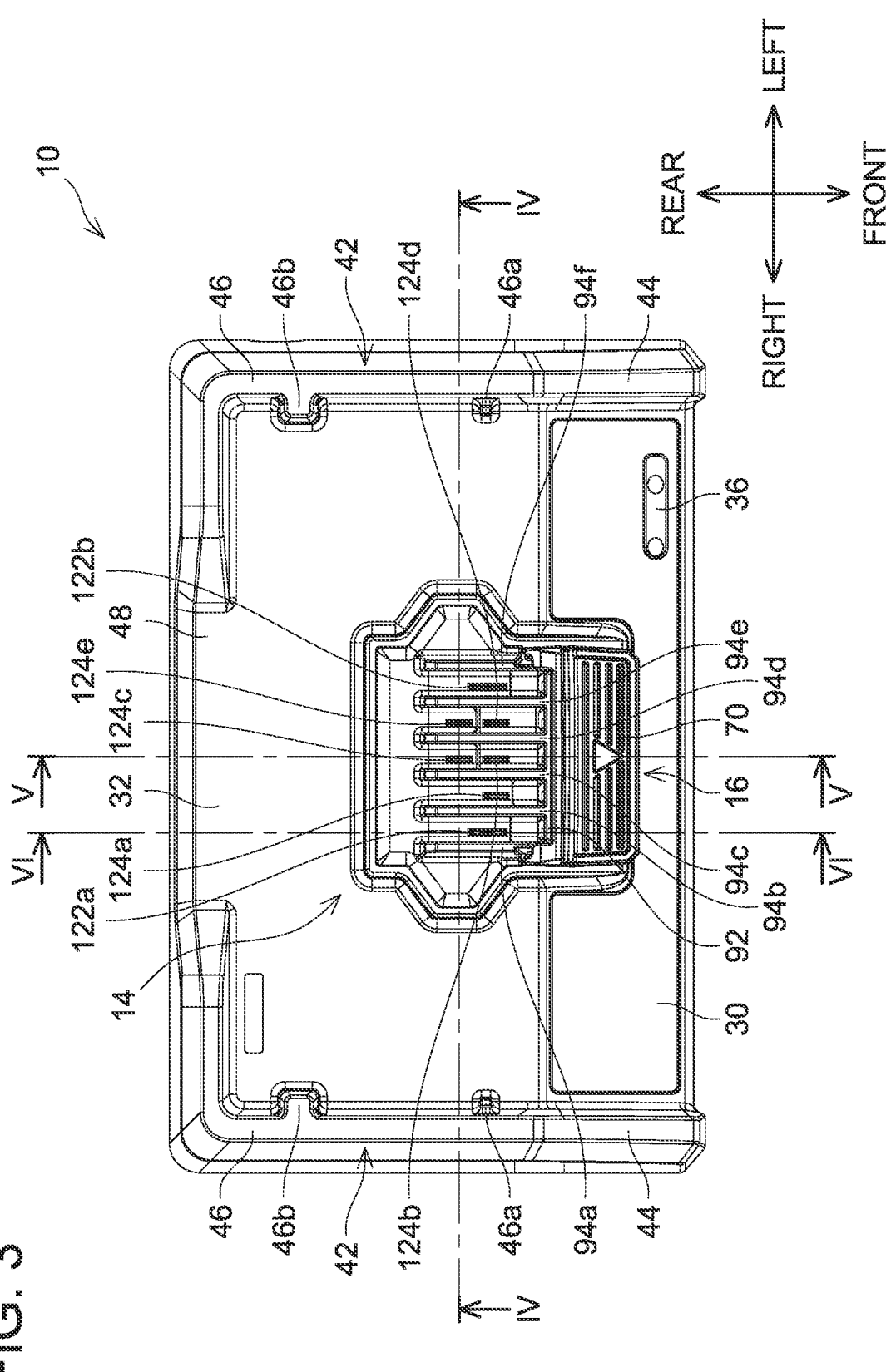
FIG. 3 is a top view of the charger 10 of the first embodiment viewed from above.

As illustrated in FIG. 2, the upper case 20 further includes standing portions 42. Each of the standing portions 42 includes a front standing portion 44 extending upward from the front upper wall 30 and a rear standing portion 46 extending upward from the rear upper wall 32. The front standing portions 44 are formed at the right and the left ends of the front upper wall 30. The upper ends of the front standing portions 44 incline such that their front sides are inclined downward. The rear standing portions 46 are formed at the right end, the left end and the rear end of the rear upper wall 32. A front rail 46a and a rear rail 46b protruding leftward are disposed on a right wall among the rear standing portions 46. As illustrated in FIG. 3, a front rail 46a and a rear rail 46b extending rightward are disposed on a left wall among the rear standing portions 46. The front rails 46a and the rear rails 46b extend in the up-down direction. The front rail 46a and the rear rail 46b disposed on the right wall have shapes corresponding to a first right guide groove 260 and second right guide groove 262 of the battery pack 200 (see FIG. 18) to be described later, respectively. The front rail 46a and the rear rail 46b disposed on the left wall have shapes corresponding to a first left guide groove 264 and second left guide groove 266 of the battery pack 200 (see FIG. 17) to be described later, respectively. A sliding direction of the battery pack 200 (the up-down direction in the present embodiment) is defined by the front rails 46a and the rear rails 46b. A recess 48 is defined between the left rear wall and the right rear wall of the opposite rear standing portions 46.

Figure 8:
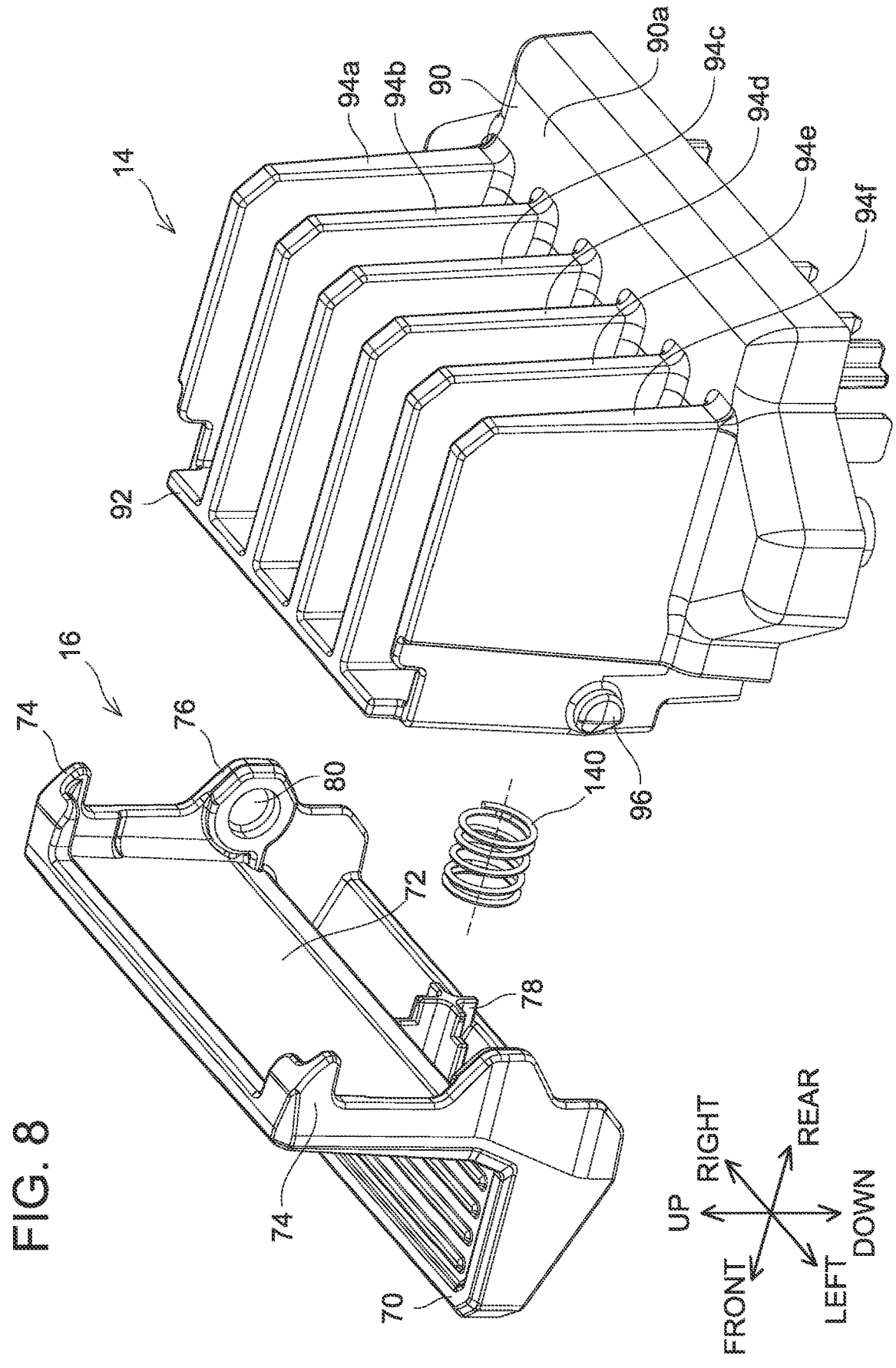
FIG. 8 is a disassembled view of the terminal unit 14 and a hook 16 of the first embodiment.

As illustrated in FIG. 8, the hook 16 includes an operation part 70, a rear wall 72 extending upward from the rear end of the operation part 70, engaging portions 74, connecting portions 76 and a rear protrusion 78. The operation part 70 is to be operated by a worker when the battery pack 200 is detached from the charger 10. The engaging portions 74 and the connecting portions 76 extend rearward from both the left and right ends of the rear wall 72. Upper surfaces of the engaging portions 74 incline such that their rear sides are inclined downward, and the lower surfaces of the engaging portions 74 are substantially parallel to a plane including the front-rear direction and the left-right direction. The engaging portions 74 are disposed at the upper end of the rear wall 72. The connecting portions 76 are located lower than the engaging portions 74. Recesses 80 having shapes corresponding to side protruding portions 96, 98 of the terminal unit 14 to be described later are defined in the connecting portions 76. The rear protrusion 78 extends rearward from the rear wall 72. The rear protrusion 78 is located lower than the connecting portions 76. A spring 140 is attached to the rear protrusion 78. As illustrated in FIG. 5, the upper end of the hook 16 is located lower than the upper ends of the front standing portions 44. In the present embodiment, under the state where the hook 16 is not operated by the worker, a distance D1 between the upper end of the hook 16 and each of the upper ends of the front standing portions 44 is 2 [mm].

Figure 9:
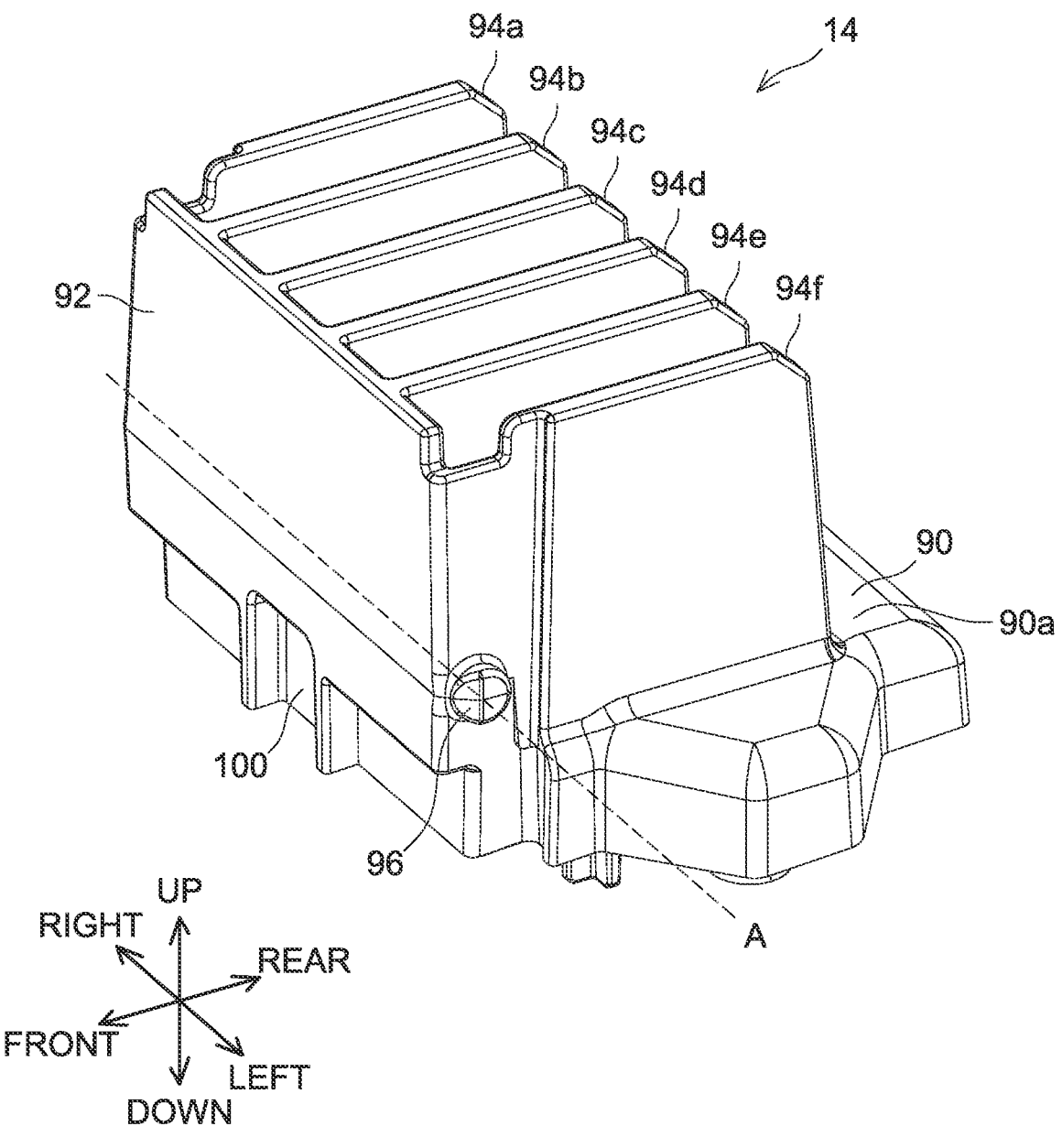
FIG. 9 is a perspective view of the terminal unit 14 of the first embodiment viewed from the left upper front side.
Figure 10:
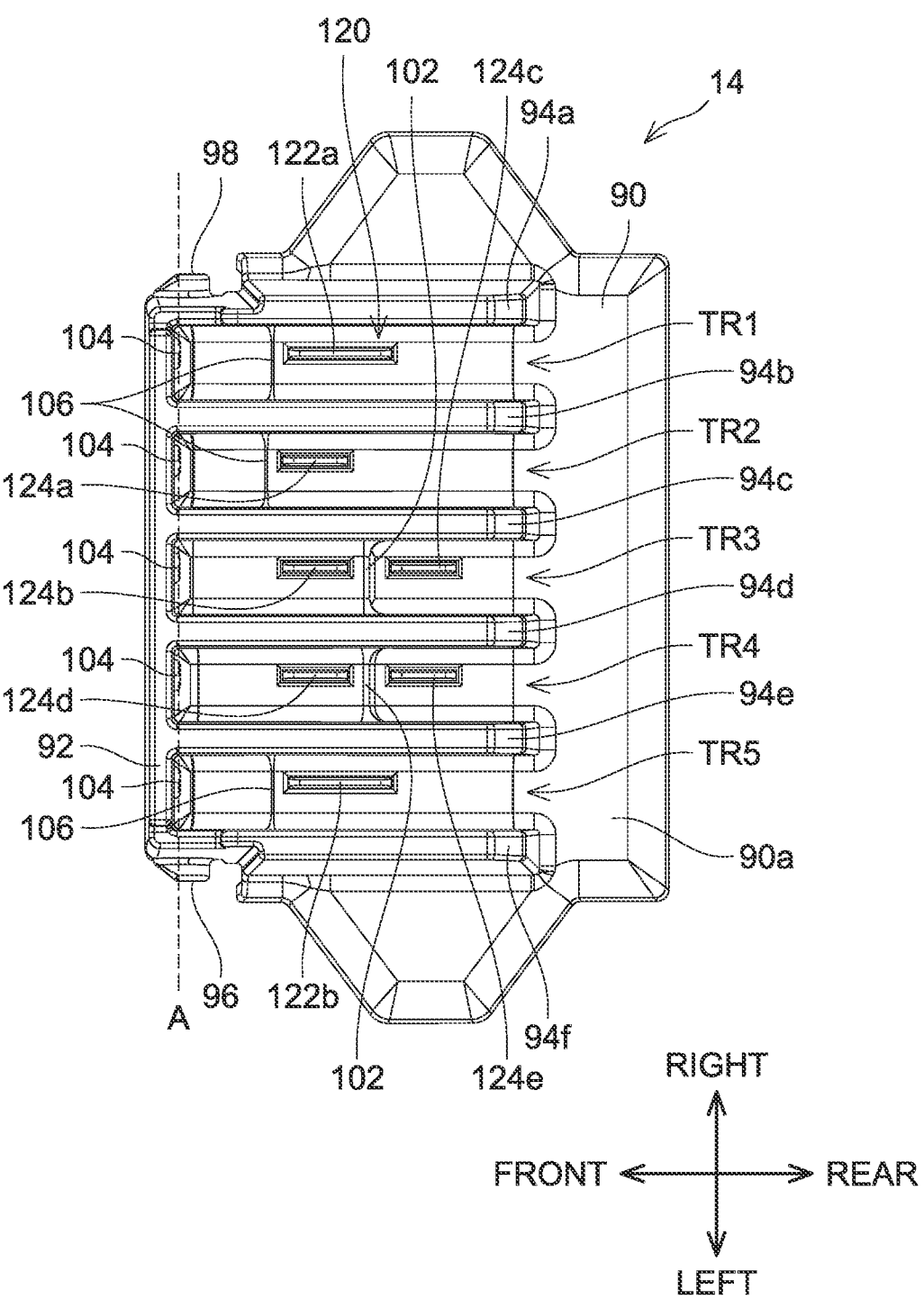
FIG. 10 is a top view of the terminal unit 14 of the first embodiment viewed from above.

As illustrated in FIG. 8 and FIG. 9, the terminal unit 14 includes a base 90, a front rib 92 extending upward from an upper surface 90a of the base 90 and side ribs 94a to 94f extending upward from the upper surface 90a. The side ribs 94a to 94f extend along a plane including the front-rear direction and the up-down direction. The side ribs 94a to 94f are disposed with spaces therebetween in the left-right direction. The front rib 92 extends along a plane including the left-right direction and the up-down direction and connects the front portions of the side ribs 94a to 94f. The side protruding portion 96 protruding leftward is disposed at a front lower portion of the side rib 94f disposed on the leftmost side. As illustrated in FIG. 10, the side protruding portion 98 protruding rightward is disposed at a front lower portion of the side rib 94a disposed on the rightmost side. When viewed in the left-right direction, the side protruding portions 96, 98 have circular shapes. The side protruding portions 96, 98 protrude along an axis A extending along the left-right direction. The hook 16 can be attached to the terminal unit 14 by inserting the side protruding portions 96, 98 to the recesses 80 in the hook 16. Under the state where the hook 16 is attached to the terminal unit 14, the hook 16 can rotate with the axis A of the side protruding portions 96, 98 as the rotation axis with respect to the terminal unit 14. As illustrated in FIG. 9, an indentation 100 is defined below the front rib 92. Under the state where the hook 16 is attached to the terminal unit 14, a part of the spring 140 is disposed in the indentation 100.

As illustrated in FIG. 10, a plurality of apparatus-side terminals 120 is attached to the base 90 of the terminal unit 14. The plurality of apparatus-side terminals 120 includes charging terminals 122a, 122b used for charging the battery pack 200 and signal terminals 124a to 124e used for sending and receiving a signal to and from the battery pack 200. The upper surface 90a of the base 90 is partitioned into five terminal regions TR1 to TR5 by the front rib 92 and side ribs 94a to 94f. The charging terminals 122a, 122b are disposed in the terminal regions TR1, TR5, respectively. The signal terminal 124a is disposed in the terminal region TR2. The signal terminals 124b, 124c are disposed in the terminal region TR3. The signal terminals 124d, 124e are disposed in the terminal region TR4. The charging terminals 122a, 122b are disposed outward of the signal terminals 124a to 124e in the left-right direction. The charging terminal 122a is disposed rightward of the signal terminals 124a to 124e, and the charging terminal 122b is disposed leftward of the signal terminals 124a to 124e. The signal terminals 124b, 124c are disposed side by side in the front-rear direction. The signal terminals 124d, 124e are disposed side by side in the front-rear direction. The signal terminal 124a is disposed between the charging terminal 122a and the signal terminal 124b in the left-right direction. Lower portions of the charging terminals 122a, 122b and lower portions of the signal terminals 124a to 124e are connected to a terminal substrate 130 (see FIG. 4 to FIG. 6) housed in the body case 12.

As illustrated in FIG. 5, in the terminal region TR3, a step portion 102 for changing a height of a front portion FP3 where the signal terminal 124b is disposed and a height of a rear portion RP3 where the signal terminal 124c is disposed is arranged between the signal terminal 124b and the signal terminal 124c. The front portion FP3 inclines such that its front portion is inclined downward, and the rear portion RP3 inclines such that its rear portion is inclined downward. In other words, the front portion FP3 inclines such that its signal terminal 124b side is located lower than its step portion 102 side, and the rear portion RP3 inclines such that its signal terminal 124c side is located lower than its step portion 102 side. A drain hole 104 for removing water that has reached the front portion FP3 of the terminal region TR3 is defined in a lower portion of the front rib 92 defining the terminal region TR3. The structure in the terminal region TR4 is the same as the structure in the terminal region TR3 except that the signal terminals 124d, 124e are disposed therein.

Figure 6:
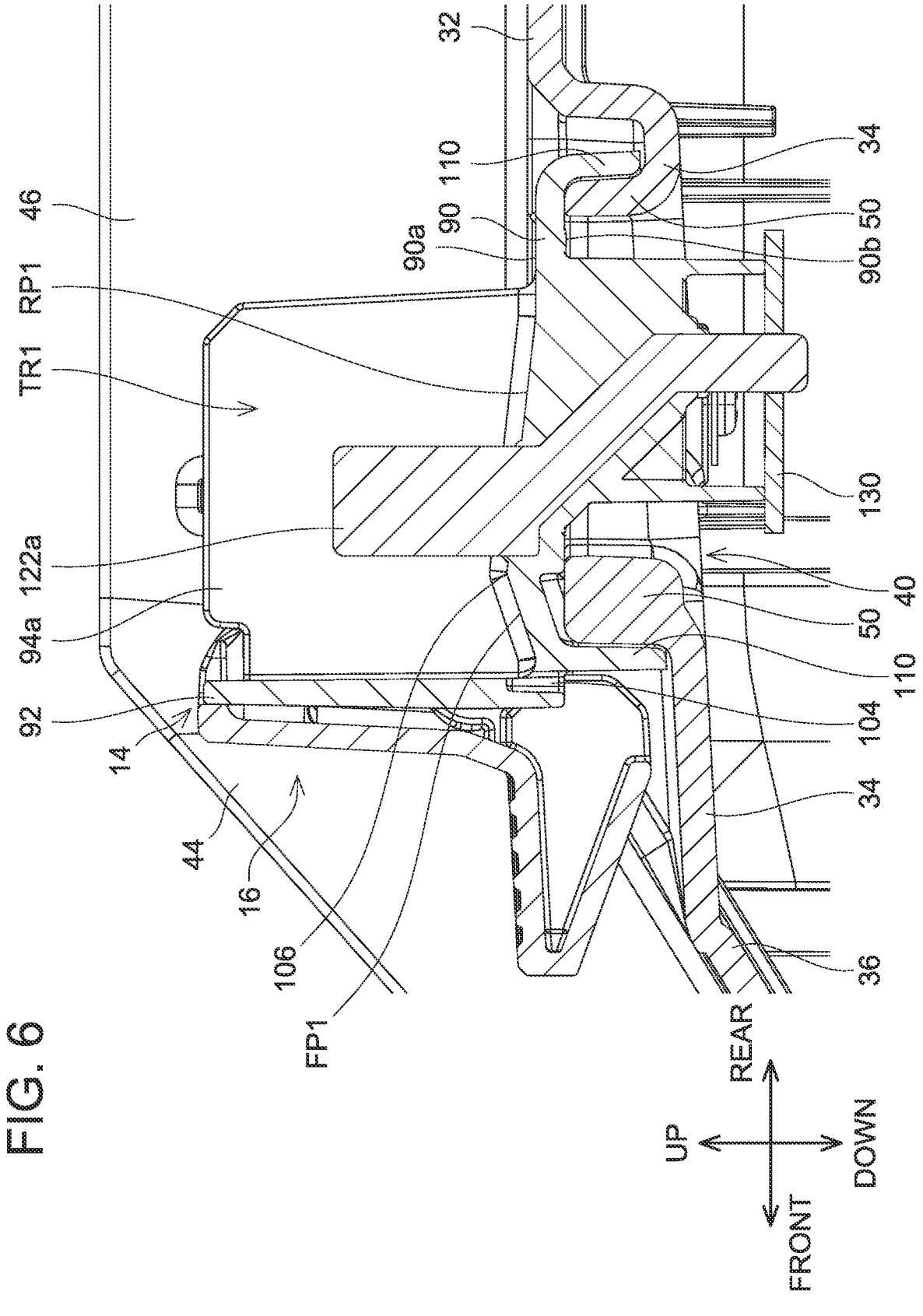
FIG. 6 is a cross-sectional view along a VI-VI line of FIG. 3.

As illustrated in FIG. 6, in the terminal region TR1, a boundary portion 106 is disposed between the charging terminal 122a and the front rib 92. In the terminal region TR1, a front portion FP1 located forward of the boundary portion 106 inclines such that its front side is inclined downward, and a rear portion RP1 located rearward of the boundary portion 106 inclines such that is rear portion is inclined downward. A drain hole 104 is defined in a lower portion of the front rib 92 defining the terminal region TR1. The insides of the terminal regions TR2, TR5 have similar shapes as a shape inside the terminal region TR1 except that the charging terminal 122b and the signal terminal 124a are disposed therein.

Figure 11:
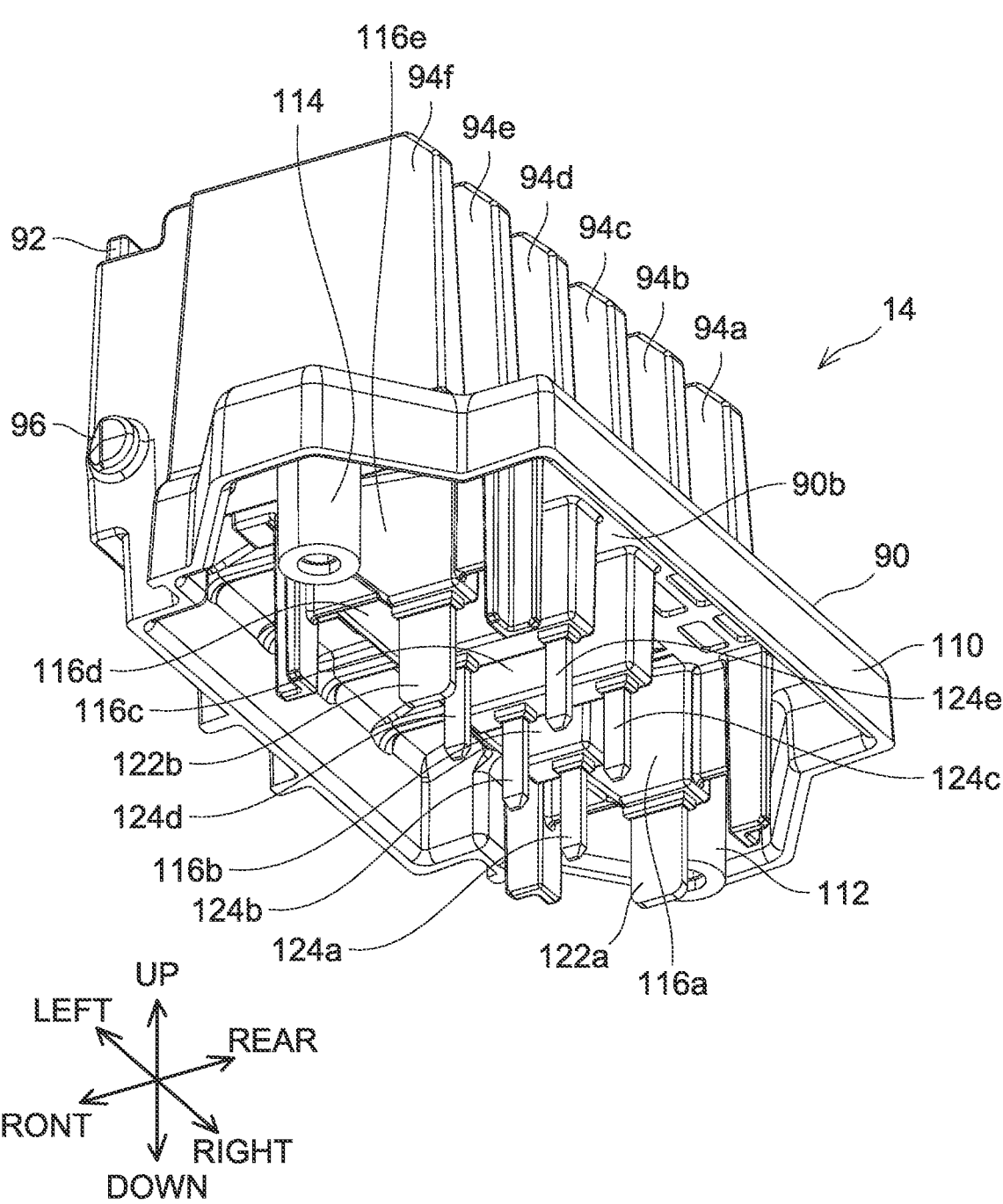
FIG. 11 is a perspective view of the terminal unit 14 of the first embodiment viewed from the left lower rear side.

As illustrated in FIG. 11, the terminal unit 14 further includes a lower rib 110, two boss portions 112, 114 and terminal fixing portions 116a to 116e. The lower rib 110 extends downward from a lower surface 90b of the base 90. An inner profile of the lower rib 110 has a shape corresponding to an outer profile of the upper rib 50 of the upper case 20 (see FIG. 7). As illustrated in FIG. 4 to FIG. 6, the lower rib 110 is disposed such that it is positioned outward of the upper rib 50 of the upper case 20. As illustrated in FIG. 5 and FIG. 6, the drain hole 104 is positioned closer to the front rib 92 than the lower rib 110 is. As illustrated in FIG. 11, the terminal fixing portions 116a to 116e extend downward from the lower surface 90b of the base 90. The charging terminal 122a is fixed to the terminal fixing portion 116a, the signal terminal 124a is fixed to the terminal fixing portion 116b, the signal terminals 124b, 124c are fixed to the terminal fixing portion 116c, the signal terminals 124d, 124e are fixed to the terminal fixing portion 116d and the charging terminal 122b is fixed to the terminal fixing portion 116e. The boss portions 112, 114 extend downward from the lower surface 90b. The boss portions 112, 114 are disposed at positions corresponding to attachment portions 52, 54 of the upper case 20, respectively. As illustrated in FIG. 4, an outer diameter of each of the boss portions 112, 114 is smaller than a diameter of each of the through holes 52a, 54a of the attachment portions 52, 54. In the present embodiment, a screw B having a flange C having an outer diameter greater than the diameter of each of the through holes 52a, 54a is screwed into each of the boss portions 112, 114. Each of the attachment portions 52, 54 of the body case 12 is clamped between the flange C of the screw B and the lower surface 90*b* of the base 90 of the terminal unit 14, by which the terminal unit 14 is attached to the body case 12. Under the state where the terminal unit 14 is attached to the body case 12, it can be said that the base 90 of the terminal unit 14 is a part of the upper wall 20*a* of the body case 12. Under the state where the terminal unit 14 is attached to the body case 12, spaces S are provided between the boss portions 112, 114 and the attachment portions 52, 54 in the left-right direction. Spaces S are also provided between the lower rib 110 of the terminal unit 14 and the upper rib 50 of the upper case 20 in the left-right direction. In other words, the terminal unit 14 can slightly move in the horizontal direction relative to the body case 12. In a variant, the screw B may not include a flange. In the present variant, a washer having an outer diameter greater than each of the through holes 52*a*, 54*a* may be used.

Figure 16:
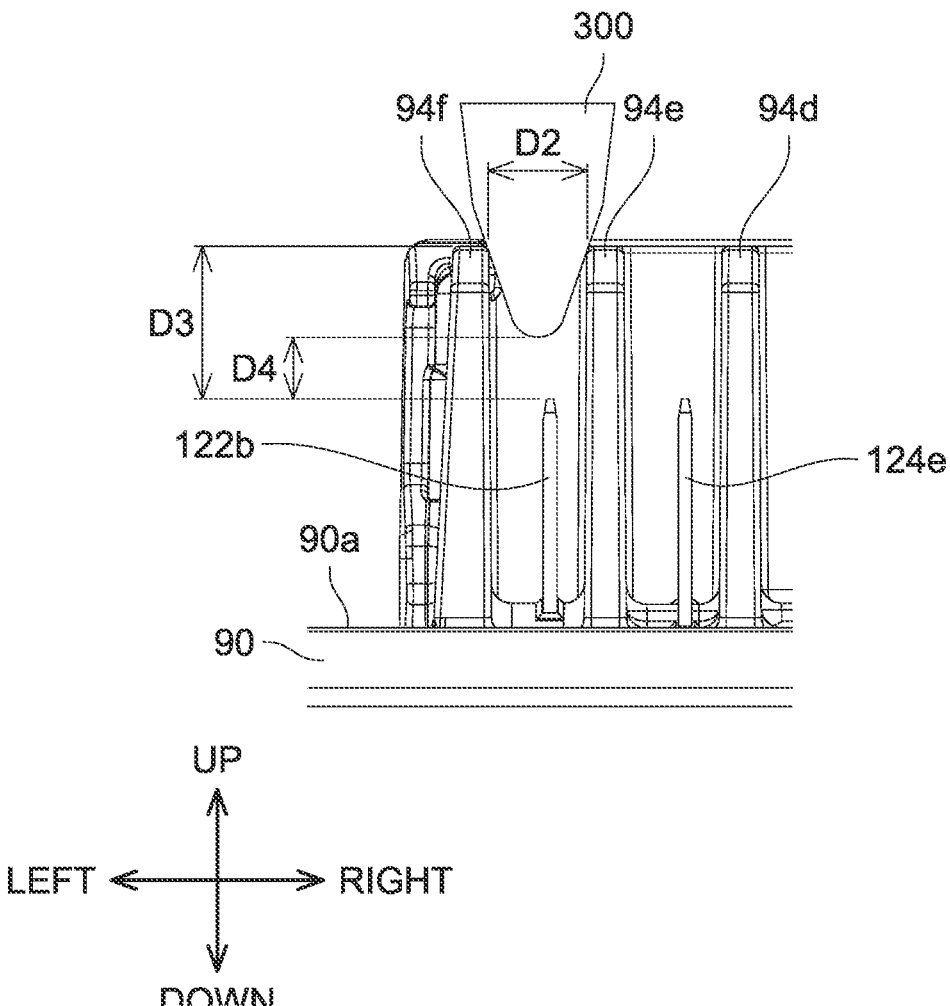
FIG. 16 is a schematic view illustrating how to set a distance between a side rib 94e and a side rib 94f of the first embodiment.

With reference to FIG. 16, an example of how to set a distance D2 between the side rib 94*e* and the side rib 94*f* will be described. The charging terminal 122*b* is a terminal used for charging, thus a higher voltage is applied thereto than to the signal terminals 124*a* to 124*e*. Thus, it is desirable to set the distance D2 so that a worker's finger does not come into contact with the charging terminal 122*b*. In the present embodiment, the distance D2 is set such that, even when an object 300 which mocks a pinky of the worker adversely enters between the side rib 94*e* and the side rib 94*f*, a distance D4 between the end of an object 300 and the upper end of the charging terminal 122*b* is equal to or greater than 1.5 [mm]. In the present embodiment, a distance D3 between the upper end of the charging terminal 122*b* and each of the upper ends of the side rib 94*e* and the side rib 94*f* is approximately 11 [mm]. In this case, by setting the distance D2 smaller than approximately 7 [mm], it is possible to make the distance D4 equal to or greater than 1.5 [mm] even when the object 300 enters between the side rib 94*e* and the side rib 94*f*. Thus, in the present embodiment, the distance D2 is approximately 7 [mm] and the distance D3 is approximately 5 [mm]. As described above, the distance D2 can be set based on the distance D3 and the like. A distance between the side rib 94*a* and the side rib 94*b* defining the terminal region TR1 in which the charging terminal 122*a* is disposed is also approximately 7 [mm]. For example, when the distance D2 is set to 10 [mm] in the case where the distance D3 is 15 [mm], the distance D4 will be 3 [mm].

(Configuration of Battery Pack 200)

Figure 17:
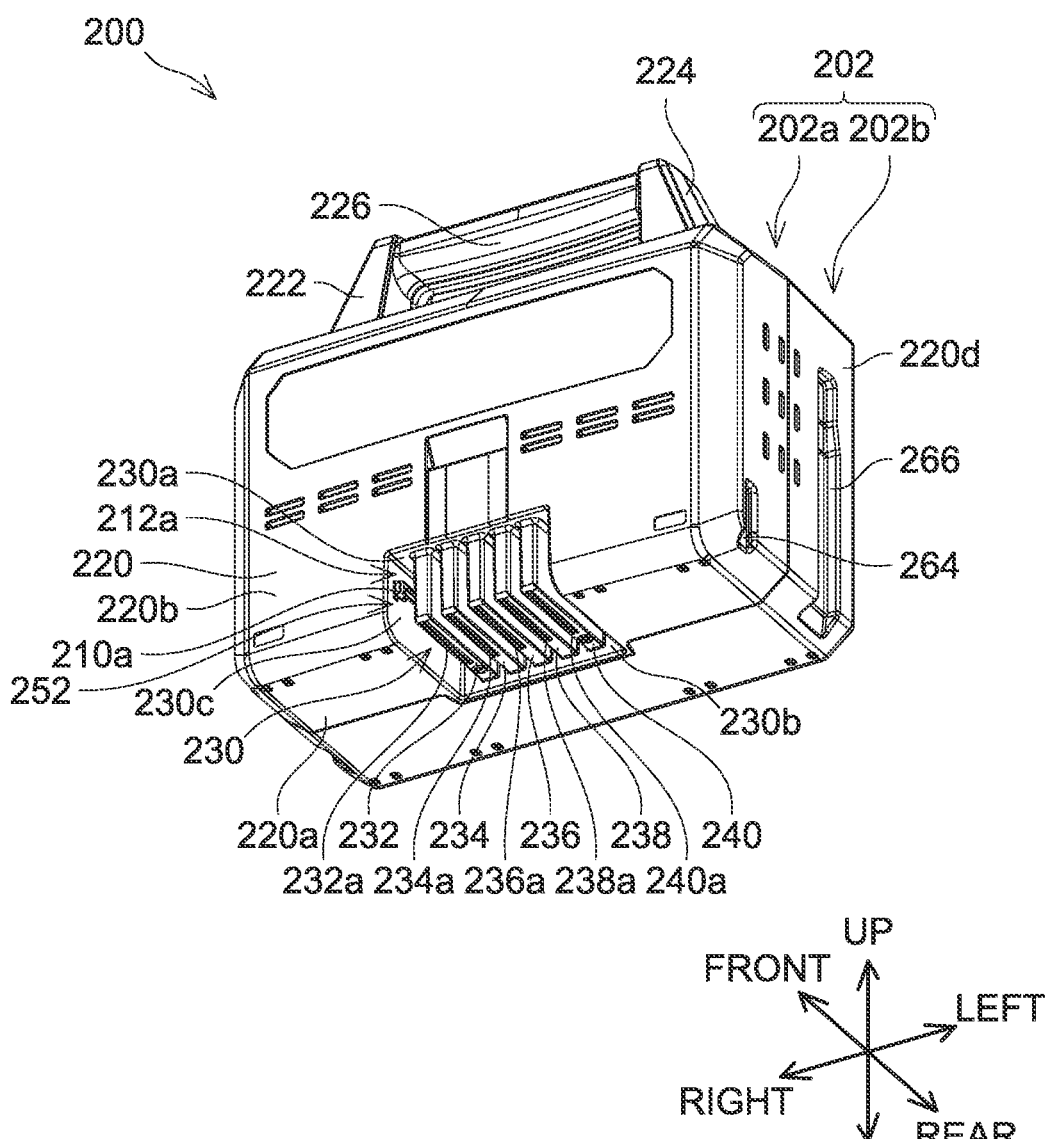
FIG. 17 is a perspective view of a battery pack 200 of the first embodiment viewed from the left lower front side.
Figure 18:
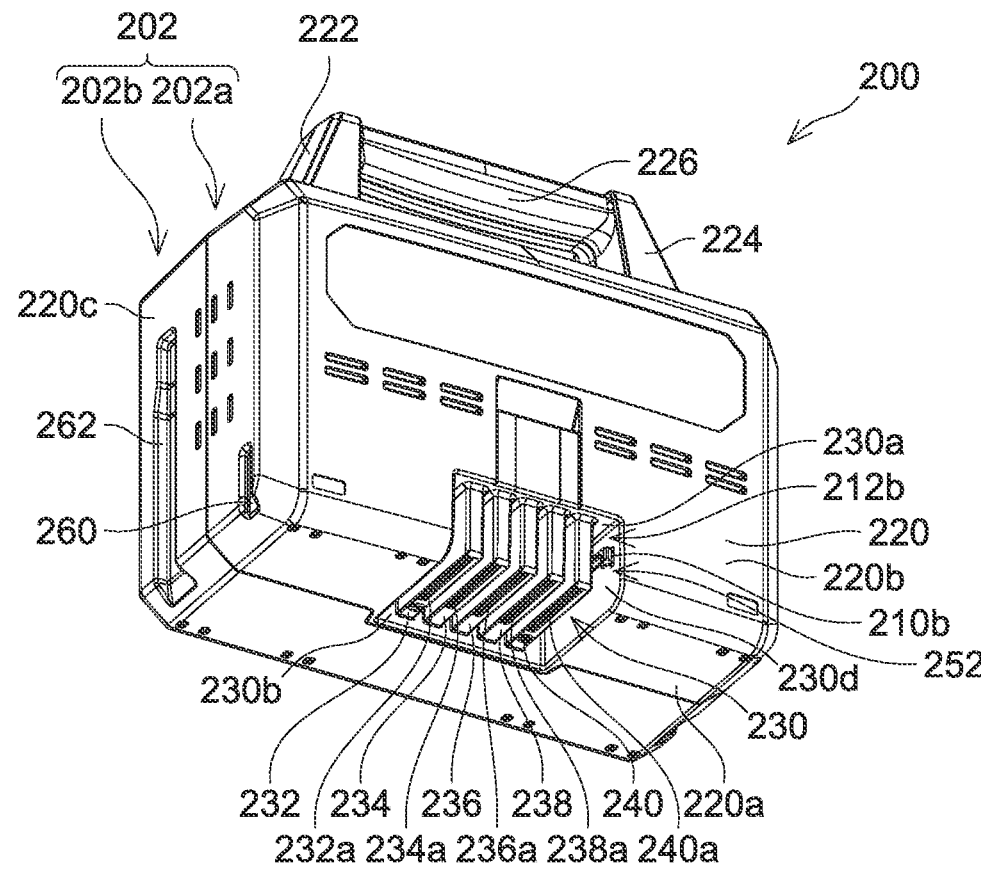
FIG. 18 is a perspective view of the battery pack 200 of the first embodiment viewed from the right lower front side.
Figure 18:
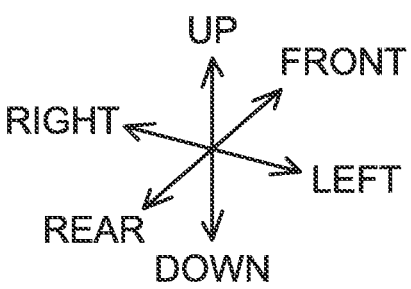

With reference to FIG. 17 to FIG. 25, the battery pack 200 will be described. As illustrated in FIG. 17 and FIG. 18, the battery pack 200 includes a housing 202. The housing 202 is constituted of a front housing 202*a* and a rear housing 202*b*. The housing 202 includes a body portion 220, a right support portion 222, a left support portion 224 and a grip 226. The body portion 220 has a substantially cuboid shape. The right support portion 222 protrudes upward from the vicinity of the right end of the upper surface of the body portion 220. The left support portion 224 protrudes upward from the vicinity of the left end of the upper surface of the body portion 220. The grip 226 extends in the left-right direction and connects the vicinity of the upper end of the left surface of the right support portion 222 and the vicinity of the upper end of the right surface of the left support portion 224. A weight of the battery pack 200 is for example within a range from 1.0 kg to 4.0 kg, and more specifically, 2.2 kg. A rated voltage of the battery pack 200 is for example within a range from 36 V to 108 V, and more specifically, 57.6 V. A rated capacity of the battery pack 200 is for example within a range from 3.0 Ah to 12.0 Ah, and more specifically, 4.0 Ah.

A terminal interface (hereafter may be referred to as "IF") portion 230 is formed at a front lower portion of the body portion 220 in the vicinity of the center of the body portion 220 in the left-right direction. The terminal IF portion 230 has a recessed shape in which a front portion and a lower portion of the terminal IF portion 230 are open. The terminal IF portion 230 includes an IF upper surface 230*a*, an IF rear surface 230*b*, an IF right surface 230*c* and an IF left surface 230*d* (see FIG. 18). The IF upper surface 230*a* is along the front-rear direction and the left-right direction, faces downward, and is offset upward from the lower surface 220*a* of the body portion 220. The IF rear surface 230*b* is along the up-down direction and the left-right direction, faces frontward and is offset rearward from the front surface 220*b* of the body portion 220. The IF right surface 230*c* is along the front-rear direction and up-down direction and faces leftward. The IF left surface 230*d* (see FIG. 18) is along the front-rear direction and the up-down direction and faces rightward. The terminal IF portion 230 includes a plurality of terminal housing portions 232 to 240 disposed side-by-side in the left-right direction between the IF right surface 230*c* and the IF left surface 230*d*. The terminal housing portions 232 to 240 extend forward from the IF rear surface 230*b* of the terminal IF portion 230, and extend downward from the IF upper surface 230*a* of the terminal IF portion 230. Lower surfaces of the terminal housing portions 232 to 240 are disposed higher than the lower surface 220*a* of the body portion 220 and are substantially coplanar. Front surfaces of the terminal housing portions 232 to 240 are disposed rearward of the front surface 220*b* of the body portion 220 and are substantially coplanar. Terminal openings 232*a* to 240*a* are defined in the lower surfaces of the terminal housing portions 232 to 240. Each of the terminal openings 232*a* to 240*a* is a slit-like through hole having its longitudinal direction along the front-rear direction.

Figure 19:
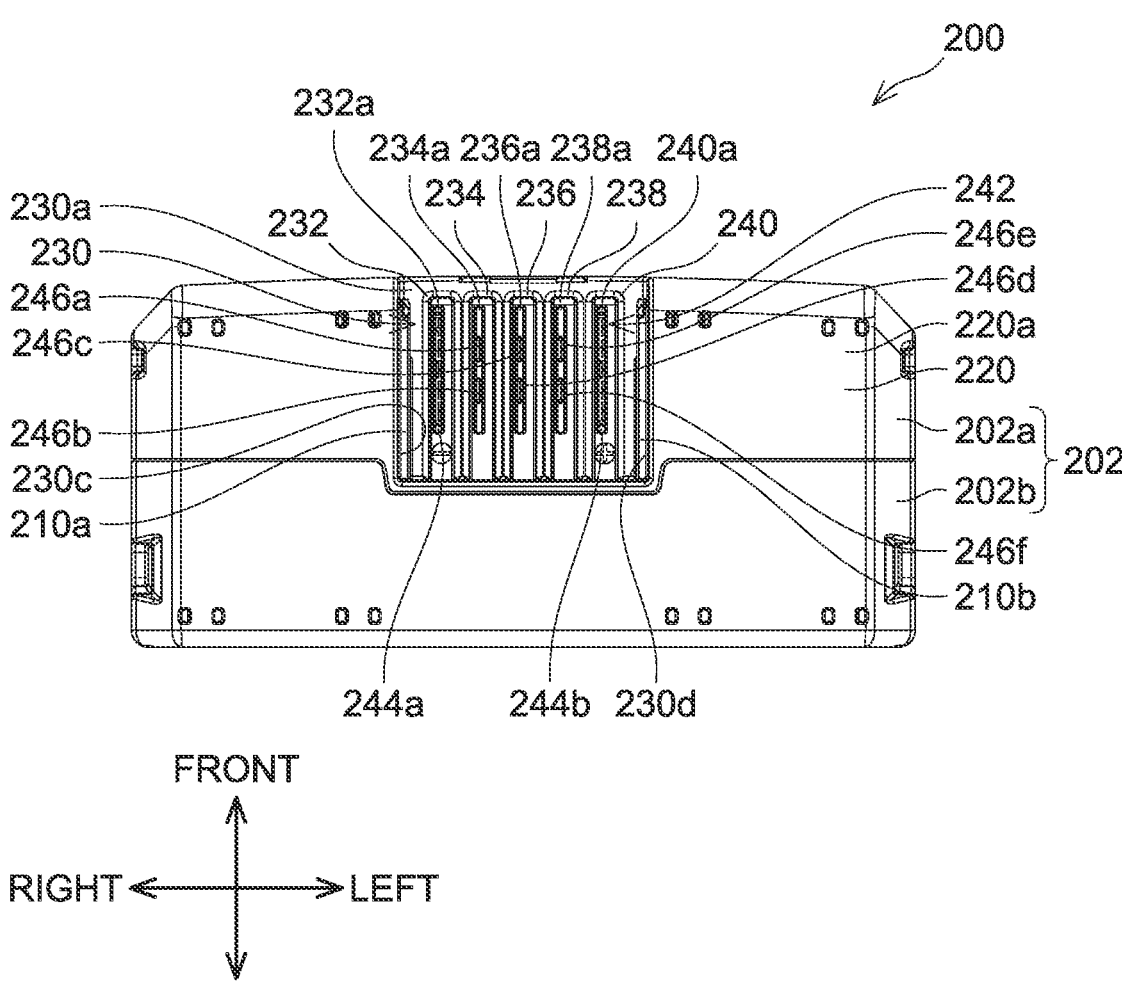
FIG. 19 is a bottom view of the battery pack 200 of the first embodiment viewed from below.
Figure 21:
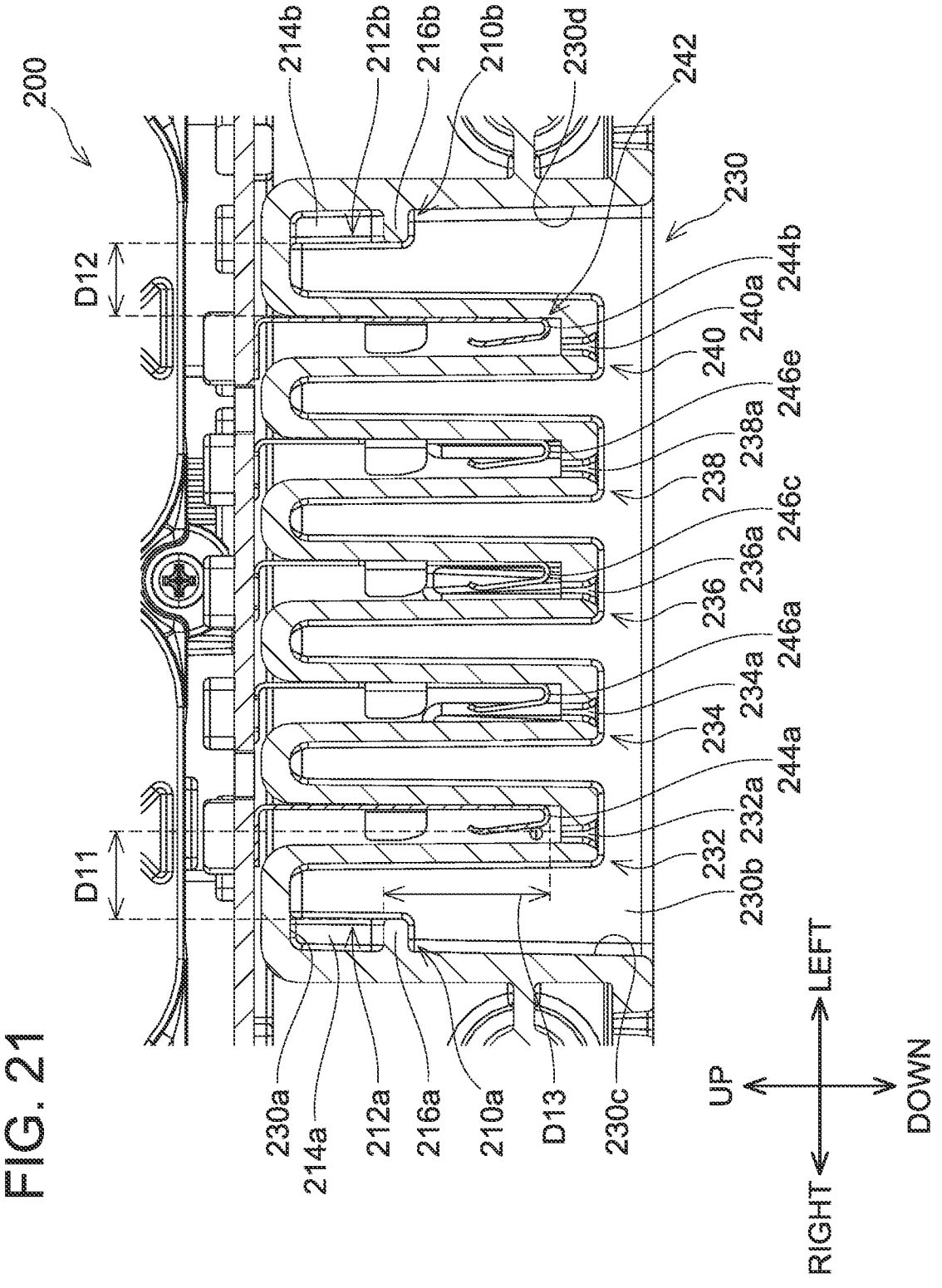
FIG. 21 is a front cross-sectional view of the battery pack 200 of the first embodiment.

As illustrated in FIG. 19 and FIG. 21, a plurality of battery-side terminals 242 is housed in the terminal housing portions 232 to 240. As illustrated in FIG. 19, the plurality of battery-side terminals 242 includes battery-side power terminals 244*a*, 244*b* and battery-side signal terminals 246*a* to 246*f*. The battery-side power terminal 244*a* is housed in the rightmost terminal housing portion 232. The battery-side power terminal 244*b* is housed in the leftmost terminal housing portion 240. The battery-side signal terminals 246*a*, 246*b* are housed in the terminal housing portion 234 leftward of the rightmost terminal housing portion 232. The battery-side signal terminals 246*a*, 246*b* are disposed side-by-side in the front-rear direction. The battery-side signal terminals 246*c*, 246*d* are housed in the center terminal housing portion 236. The battery-side signal terminals 246*c*, 246*d* are arranged side by side in the front-rear direction. The battery-side signal terminals 246*e*, 246*f* are housed in the terminal housing portion 238 rightward of the leftmost terminal housing portion 240. The battery-side signal terminals 246*e*, 246*f* are arranged side by side in the front-rear direction. The battery-side power terminals 244*a*, 244*b* are terminals corresponding to the charging terminals 122*a*, 122*b* (see FIG. 3) of the charger 10, respectively. The battery-side power terminals 244*a*, 244*b* are used for charging under the state where the battery pack 200 is attached to the charger 10. The battery-side signal terminals 246*a*, 246*c* to 246*f* are terminals corresponding to the signal terminals 124*a*, 124*b* to 124*e* (see FIG. 3) of the charger 10, respectively. The battery-side signal terminals 246*a*, 246*c* to 246*f* are used to send and receive a signal to and from the charger
10 under the state where the battery pack 200 is attached to
the charger 10. When the battery pack 200 is attached to a
working machine such as a lawnmower, the battery-side
power terminals 244a, 244b are connected to apparatus-side
power terminals of the working machine and used to dis-
charge. When the battery pack 200 is attached to a working
machine such as a lawnmower, each of the battery-side
signal terminals 246b to 246f is connected to an apparatus-
side signal terminal of the working machine and used to send
and receive a signal to and from the working machine.

Figure 20:
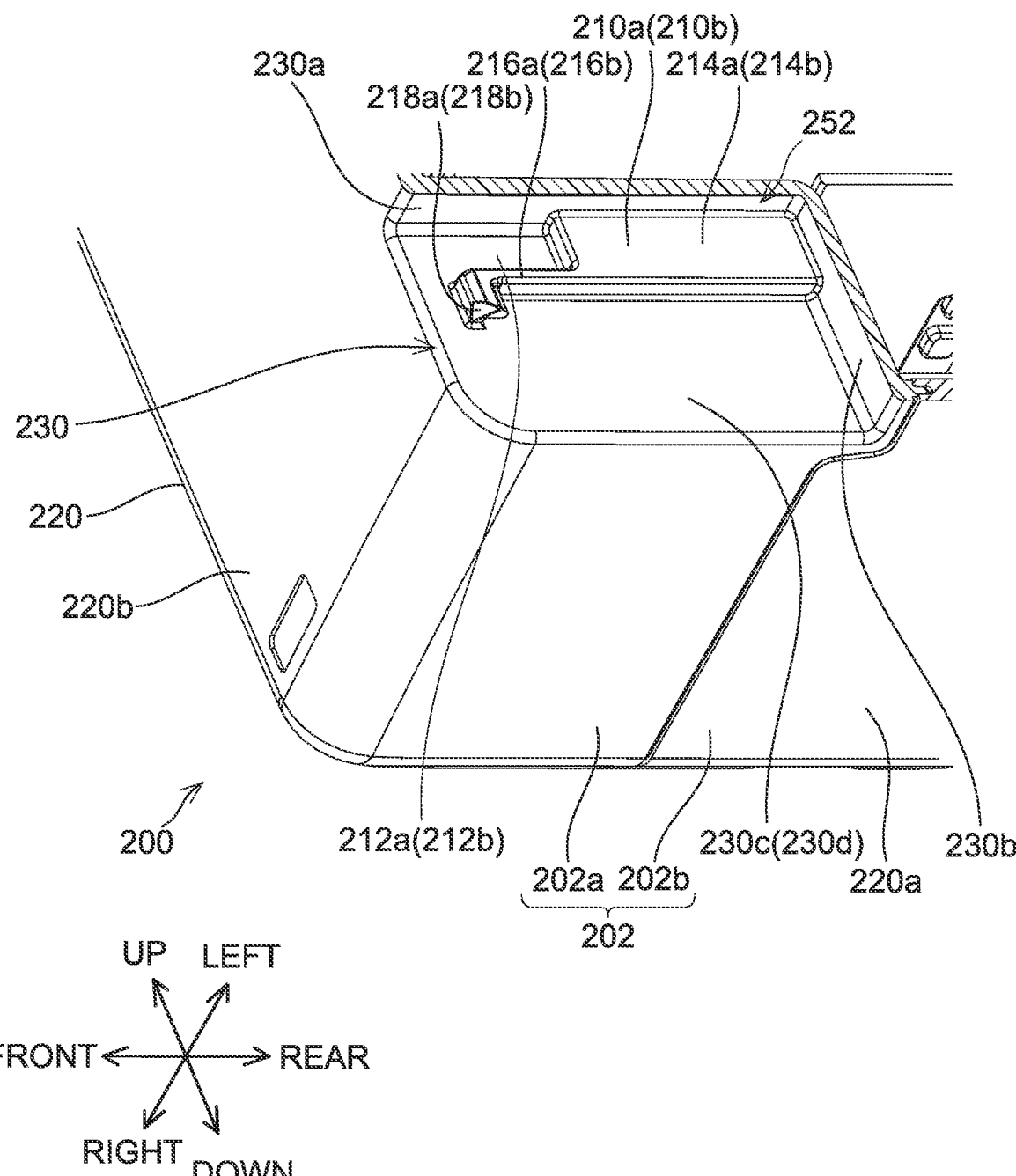
FIG. 20 is a perspective cross-sectional view of a right engaging portion 210a of the battery pack 200 of the first embodiment and its vicinity viewed from the left front lower side.

As illustrated in FIG. 17, a right engaging portion 210a
protruding leftward is formed on the IF right surface 230c of
the terminal IF portion 230. As illustrated in FIG. 18, a left
engaging portion 210b protruding rightward is disposed on
the IF left surface 230d of the terminal IF portion 230. The
right engaging portion 210a and the left engaging portion
210b are at positions and have shapes symmetrical to each
other in the left-right direction. As illustrated in FIG. 20, the
right engaging portion 210a includes a right base 214a
whose upper end is connected to the IF upper surface 230a
and rear end is connected to the IF rear surface 230b, a right
extending portion 216a extending forward from a lower
portion of the front end of the right base 214a and a right tip
end 218a extending downward from the front end of the
right extending portion 216a. A right groove 212a extending
in the front-rear direction is defined by the IF upper surface
230a, the right base 214a and the right extending portion
216a. Similarly, the left engaging portion 210b includes a
left base 214b whose upper end is connected to the IF upper
surface 230a and rear end is connected to the IF rear surface
230b, a left extending portion 216b extending frontward
from a lower portion of the front end of the left base 214b
and a left tip end 218b extending downward from the front
end of the left extending portion 216b. A left groove 212b
extending in the front-rear direction is defined by the IF
upper surface 230a, the left base 214b and the left extending
portion 216b.

As illustrated in FIG. 21, the right groove 212a and the
left groove 212b are defined in the vicinity of the plurality
of battery-side terminals 242. The engaging portions 74 of
the hook 16 of the charger 10 (see FIG. 8) are to be engaged
with the right groove 212a and the left groove 212b. Here,
being in the vicinity of the plurality of battery-side terminals
242 means that a distance between the battery-side terminals
242 and each of the right groove 212a and the left groove
212b is equal to or smaller than 30 [mm]. In the present
embodiment, the distance D11 between the right groove
212a and the battery-side power terminal 244a housed in the
terminal housing portion 232 among the plurality of battery-
side terminals 242 and the distance D12 between the left
groove 212b and the battery-side power terminal 244b
housed in the terminal housing portion 240 among the
plurality of battery-side terminals 242 are each equal to or
smaller than 30 [mm]. Each of the distances D11 and D12
may be equal to or smaller than [mm]. As illustrated in FIG.
5, it is desirable that the upper end of the hook 16 is located
lower than the upper ends of the standing portions 42
(specifically, the front standing portions 44). Thus, in FIG.
21, for example when a distance D13 in the up-down
direction between the lower ends of the battery-side termi-
nals 242 and the lower ends of the right groove 212a and the
left groove 212b is set equal to or lower than 15 [mm], it is
possible to lower positions of the upper end of the hook 16
engaging with the right groove 212a and the left groove
212b and the upper ends of the standing portions 42 and thus
reduce a size of the charger 10 in the up-down direction while the structure in which the upper end of the hook 16 is
located lower than the upper ends of the standing portions 42
is maintained. Moreover, for example, by setting the dis-
tance in the left-right direction between the battery-side
terminals 242 and the right groove 212a and the left groove
212b (i.e., the distance D11, D12) equal to or smaller than
15 [mm], a size of the hook 16 can be reduced in the
left-right direction.

Figure 22:
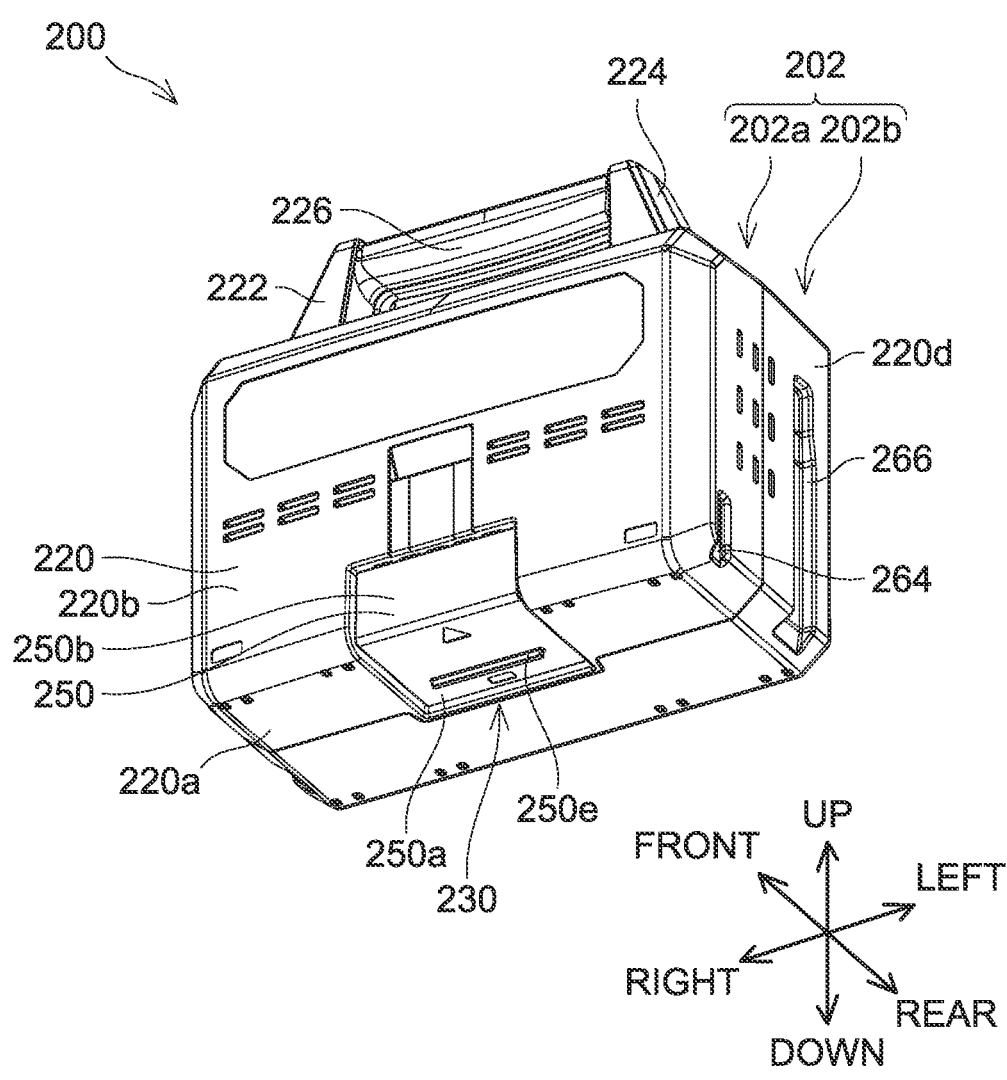
FIG. 22 is a perspective view of the battery pack 200 of the first embodiment with a terminal cover 250 attached, viewed from the left lower front side.

As illustrated in FIG. 22, the terminal cover 250 can
detachably be attached to the terminal IF portion 230. The
terminal cover 250 can be attached to the terminal IF portion
230 by sliding the terminal cover 250 rearward with respect
to the terminal IF portion 230. The terminal cover 250 can
be detached from the terminal IF portion 230 by sliding the
terminal cover 250 frontward with respect to the terminal IF
portion 230.

Figure 23:
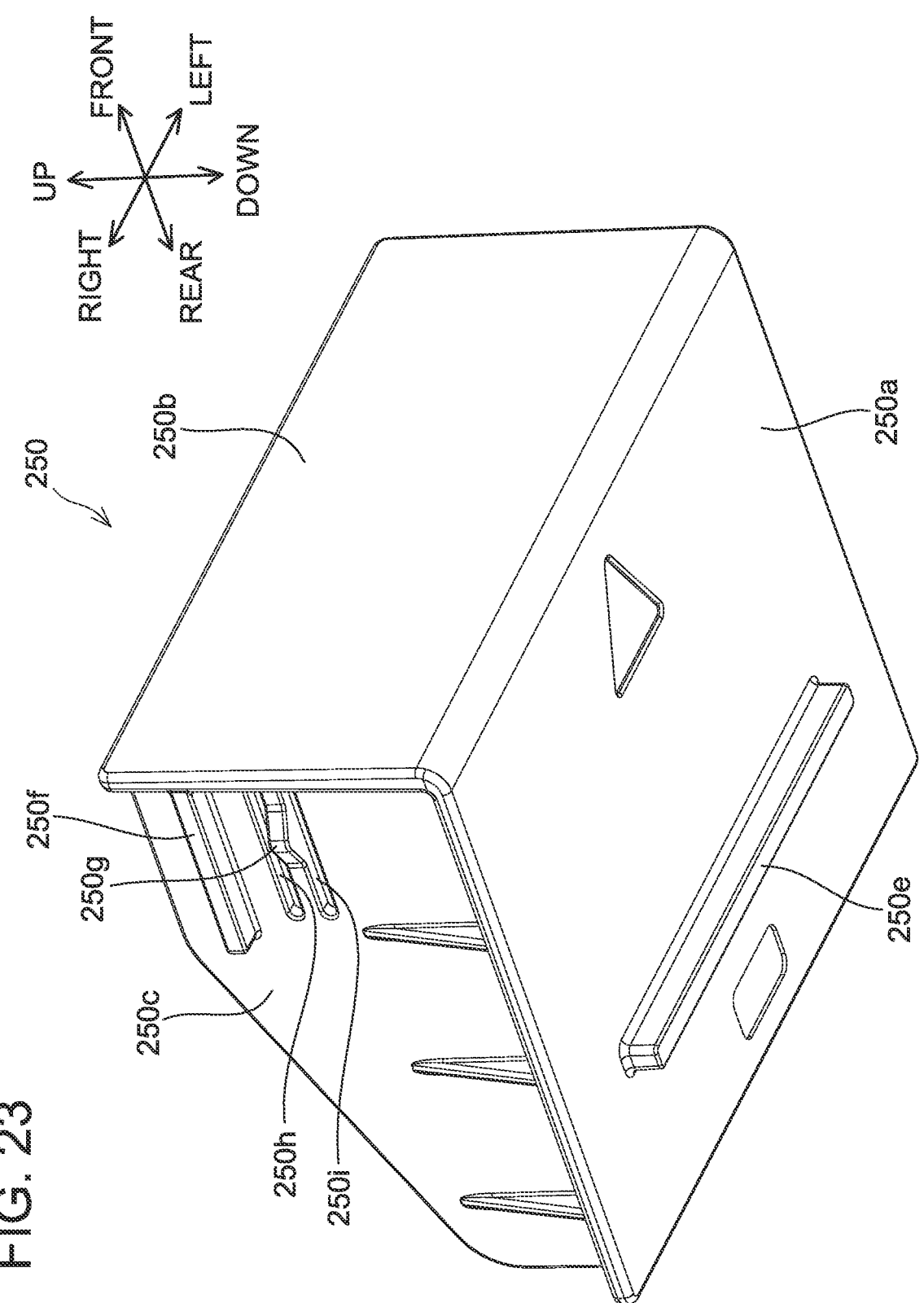
FIG. 23 is a perspective view of the terminal cover 250 of the battery pack 200 of the first embodiment viewed from the right front lower side.
Figure 24:
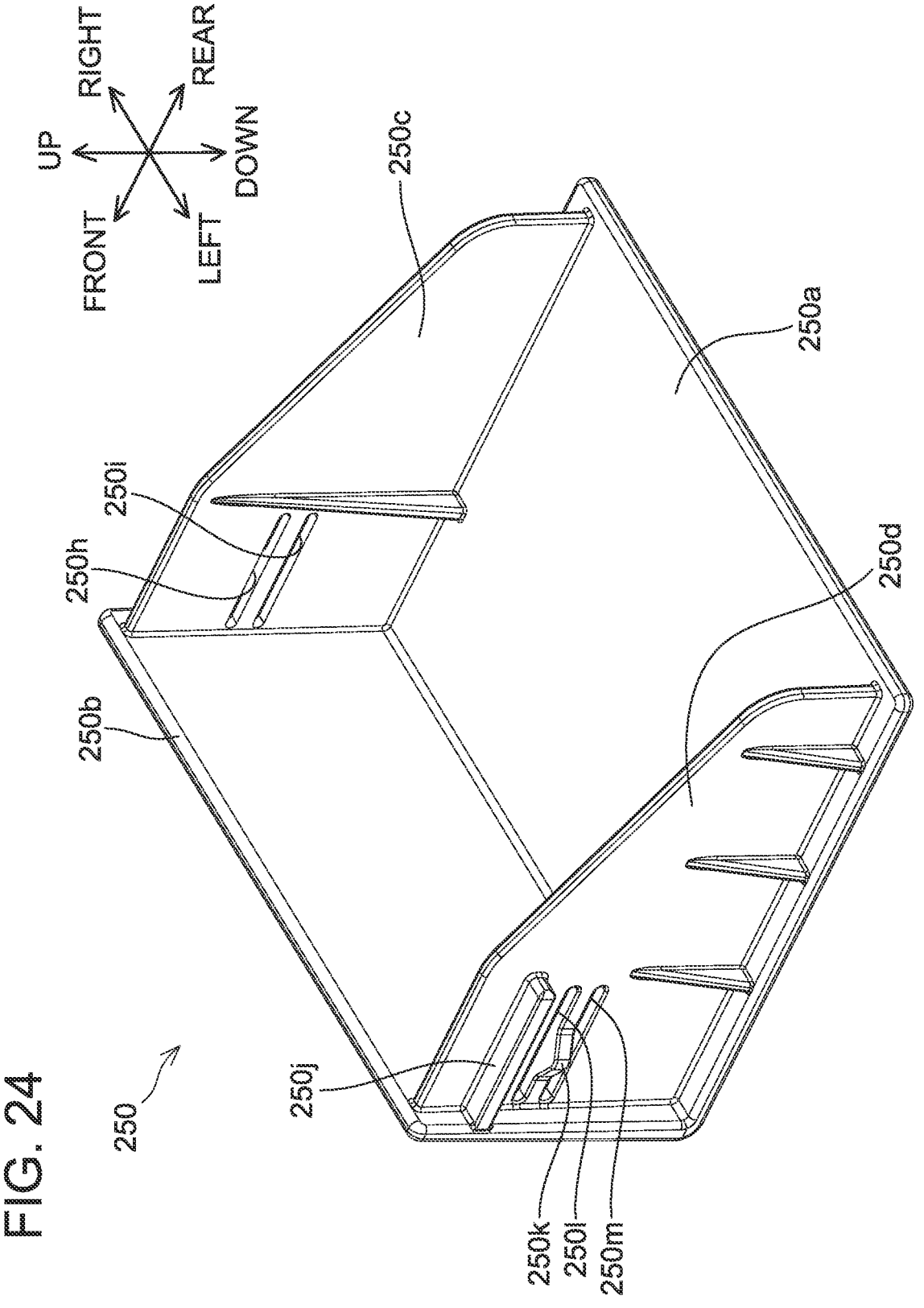
FIG. 24 is a perspective view of the terminal cover 250 of the battery pack 200 of the first embodiment viewed from the left rear upper side.

As illustrated in FIG. 23, the terminal cover 250 includes
a lower plate portion 250a, a front plate portion 250b, a right
plate portion 250c and a left plate portion 250d (see FIG.
24). The terminal cover 250 is a member constituted of resin,
and the lower plate portion 250a, the front plate portion
250b, the right plate portion 250c and the left plate portion
250d are integrally formed. The lower plate portion 250a has
a substantially flat-plate shape along the front-rear direction
and the left-right direction. The lower plate portion 250a has
a substantially rectangular shape which has its longitudinal
direction along the left-right direction and its short direction
along the front-rear direction. A finger-placement protrusion
250e protruding downward and extending in the left-right
direction is formed on the lower surface of the lower plate
portion 250a. The finger-placement protrusion 250e is dis-
posed rearward of the center of the lower plate portion 250a
in the front-rear direction. The front plate portion 250b
extends upward from the front end of the lower plate portion
250a. The front plate portion 250b has a flat-plate shape
along the up-down direction and the left-right direction. The
front plate portion 250b has a substantially rectangular shape
which has its longitudinal direction along the left-right
direction and its short direction along the up-down direction.

A right rail 250f protruding rightward and a right engag-
ing protrusion 250g protruding rightward are further dis-
posed on the right surface of the right plate portion 250c.
The right rail 250f extends in the front-rear direction. An
upper slit 250h extending in the front-rear direction above
the right engaging protrusion 250g and a lower slit 250i
extending in the front-rear direction below the right engag-
ing protrusion 250g are defined in the right plate portion
250c. Similarly, as illustrated in FIG. 24, a left rail 250j
protruding leftward and a left engaging protrusion 250k
protruding leftward are further disposed on the left surface
of the left plate portion 250d. The left rail 250j extends along
the front-rear direction. An upper slit 250l extending in the
front-rear direction above the left engaging protrusion 250k
and a lower slit 250m extending in the front-rear direction
below the left engaging protrusion 250k are defined in the
left plate portion 250d.

Figure 25:
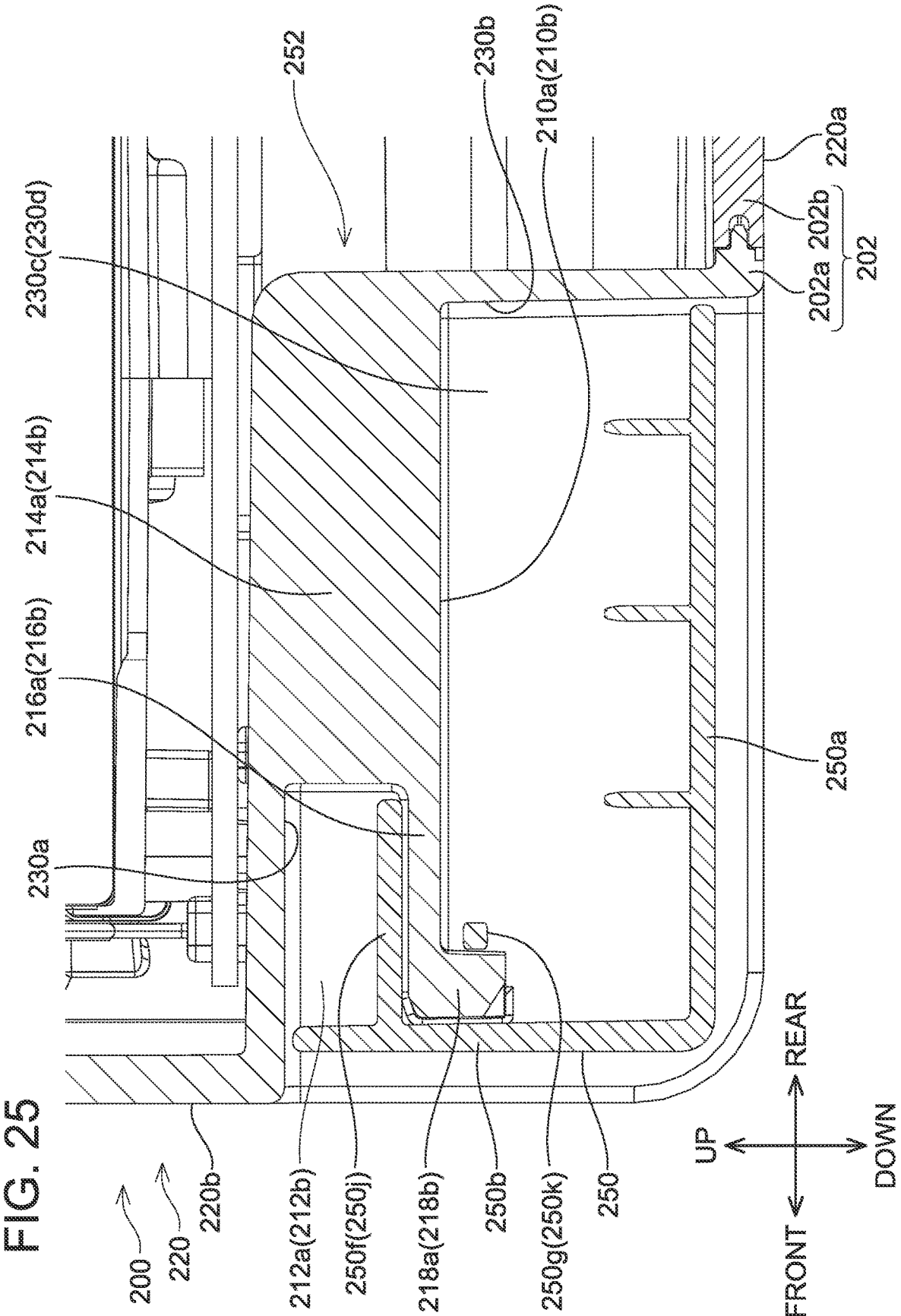
FIG. 25 is a right cross-sectional view of the battery pack 200 of the first embodiment with the terminal cover 250 attached.
Figure 26:
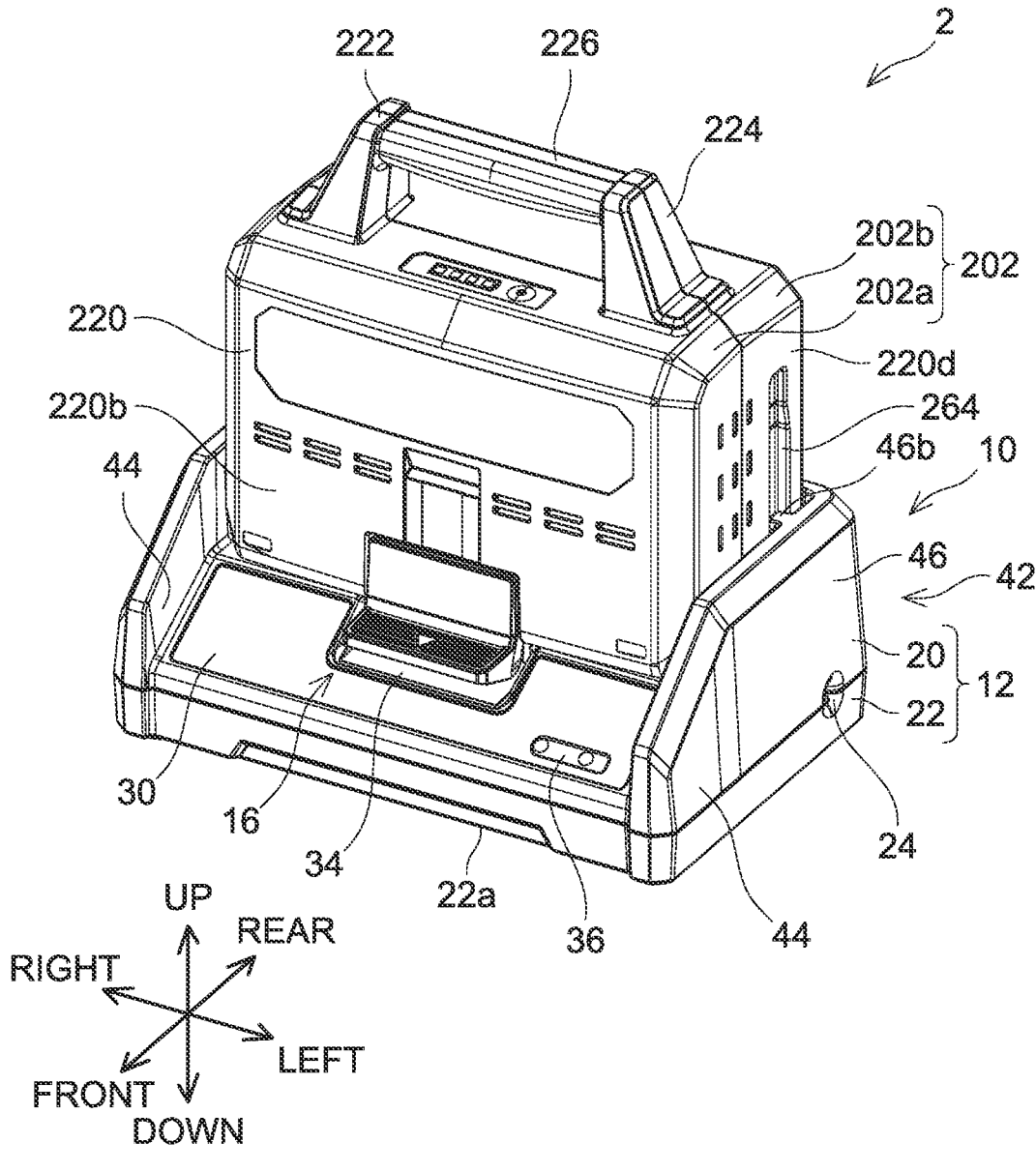
FIG. 26 is a perspective view of the battery pack 200 of the first embodiment attached to the charger 10 viewed from the left upper front side.

As illustrated in FIG. 25, when the terminal cover 250 is
to be attached to the terminal IF portion 230, the lower
surface of the right rail 250f of the terminal cover 250 slides
with respect to the upper surface of the right extending
portion 216a of the right engaging portion 210a, and the
lower surface of the left rail 250j of the terminal cover 250
slides with respect to the upper surface of the left extending
portion 216b of the left engaging portion 210b. When the
right engaging protrusion 250g of the terminal cover 250
comes into contact with the right tip end 218a of the right
engaging portion 210a, the right engaging protrusion 250g elastically deforms leftward, and when the left engaging protrusion 250k of the terminal cover 250 comes into contact with the left tip end 218b of the left engaging portion 210b, the left engaging protrusion 250k elastically deforms rightward. Then, when the right engaging protrusion 250g moves rearward beyond the right tip end 218a of the right engaging portion 210a, the elastic deformation of the right engaging protrusion 250g is released and the right engaging protrusion 250g engages with the right tip end 218a of the right engaging portion 210a, and when the left engaging protrusion 250k moves rearward beyond the left tip end 218b of the left engaging portion 210b, the elastic deformation of the left engaging protrusion 250k is released and the left engaging protrusion 250k engages with the left tip end 218b of the left engaging portion 210b. Consequently, the terminal cover 250 is fixed to the terminal IF portion 230. Hereafter, the right engaging portion 210a, the right groove 212a, the right base 214a, the right extending portion 216a, the left engaging portion 210b, the left groove 212b, the left base 214b and the left extending portion 216b may collectively be referred to "cover attachment portion 252".

As illustrated in FIG. 22, under the state where the terminal cover 250 is attached to the terminal IF portion 230 (specifically, the cover attachment portion 252), the lower surfaces of the terminal housing portions 232 to 240 (see FIG. 17) and the terminal openings 232a to 240a of the terminal housing portions 232 to 240 (see FIG. 17) are covered by the lower plate portion 250a of the terminal cover 250. Under the state where the terminal cover 250 is attached to the terminal IF portion 230, the front surfaces of the terminal housing portions 232 to 240 (see FIG. 17) are covered by the front plate portion 250b of the terminal cover 250.

When the terminal cover 250 is to be detached from the terminal IF portion 230, a user places his/her finger on the finger-placement protrusion 250e and slides the terminal cover 250 frontward with respect to the terminal IF portion 230. Consequently, the engagement between the right engaging protrusion 250g of the terminal cover 250 (see FIG. 25) and the right tip end 218a of the right engaging portion 210a is released and the engagement between the left engaging protrusion 250k of the terminal cover 250 (see FIG. 25) and the left tip end 218b of the left engaging portion 210b is released, by which the terminal cover 250 is detached from the terminal IF portion 230.

As illustrated in FIG. 18, a first right guide groove 260 extending in the up-down direction and a second right guide groove 262 extending in the up-down direction are defined in the right surface 220c of the body portion 220. The first right guide groove 260 is arranged close to the front end of the right surface 220c between the center of the right surface 220c in the front rear direction and the front end of the right surface 220c, and the second right guide groove 262 is arranged close to the rear end of the right surface 220c between the center of the right surface 220c in the front-rear direction and the rear end of the right surface 220c. The first right guide groove 260 and the second right guide groove 262 are defined at positions corresponding to the front rail 46a and rear rail 46b on the right side of the charger 10 (see FIG. 3), respectively. As illustrated in FIG. 17, a first left guide groove 264 extending in the up-down direction and a second left guide groove 266 extending in the up-down direction are defined in the left surface 220d of the body portion 220. The first left guide groove 264 is arranged close to the front end of the left surface 220d between the center of the left surface 220d in the front-rear direction and the front end of the left surface 220d, and the second left guide groove 266 is arranged close to the rear end of the left surface 220d between the center of the left surface 220d in the front-rear direction and the rear end of the left surface 220d. The first left guide groove 264 and the second left guide groove 266 are defined at positions corresponding to the front rail 46a and the rear rail 46b on the left side of charger 10 (see FIG. 3), respectively. The first right guide groove 260 and the first left guide groove 264 are at positions and have shapes symmetrical to each other in the left-right direction. The second right guide groove 262 and the second left guide groove 266 are at positions and have shapes symmetrical to each other in the left-right direction. (How to Attach and Detach Battery Pack 200 to and from Charger 10)

Next, with reference to FIG. 12 to FIG. 15, how to attach the battery pack 200 to the charger 10 and detach the battery pack 200 from the charger 10 will be described.

Figure 12:
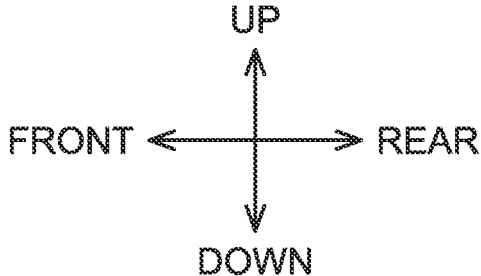
FIG. 12 is a cross-sectional view illustrating movement of the hook 16 of the first embodiment (1).
Figure 13:
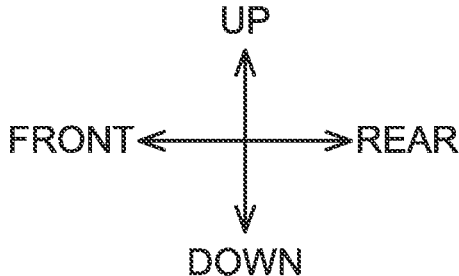
FIG. 13 is a cross-sectional view illustrating movement of the hook 16 of the first embodiment (2).

Firstly, with reference to FIG. 12 to FIG. 14, how to attach the battery pack 200 to the charger 10 will be described. As illustrated in FIG. 12, under the state where the battery pack 200 is not attached, the hook 16 is biased by the spring 140 (see FIG. 8) such that the rear wall 72 becomes substantially parallel to the up-down direction. In this state, when the worker moves the battery pack 200 downward to attach the battery pack 200 to the charger 10, the lower end of the right tip end 218a of the right engaging portion 210a and the lower end of the left tip end 218b of the left engaging portion 210b of the battery pack 200 come into contact with the engaging portions 74 of the hook 16 of the charger 10. When the worker further moves the battery pack 200 downward as illustrated in FIG. 13, the hook 16 rotes with the axis A as its rotation axis. Specifically, the engaging portions 74 moves forward, and at the same time, the operation part 70 moves downward.

Figure 14:
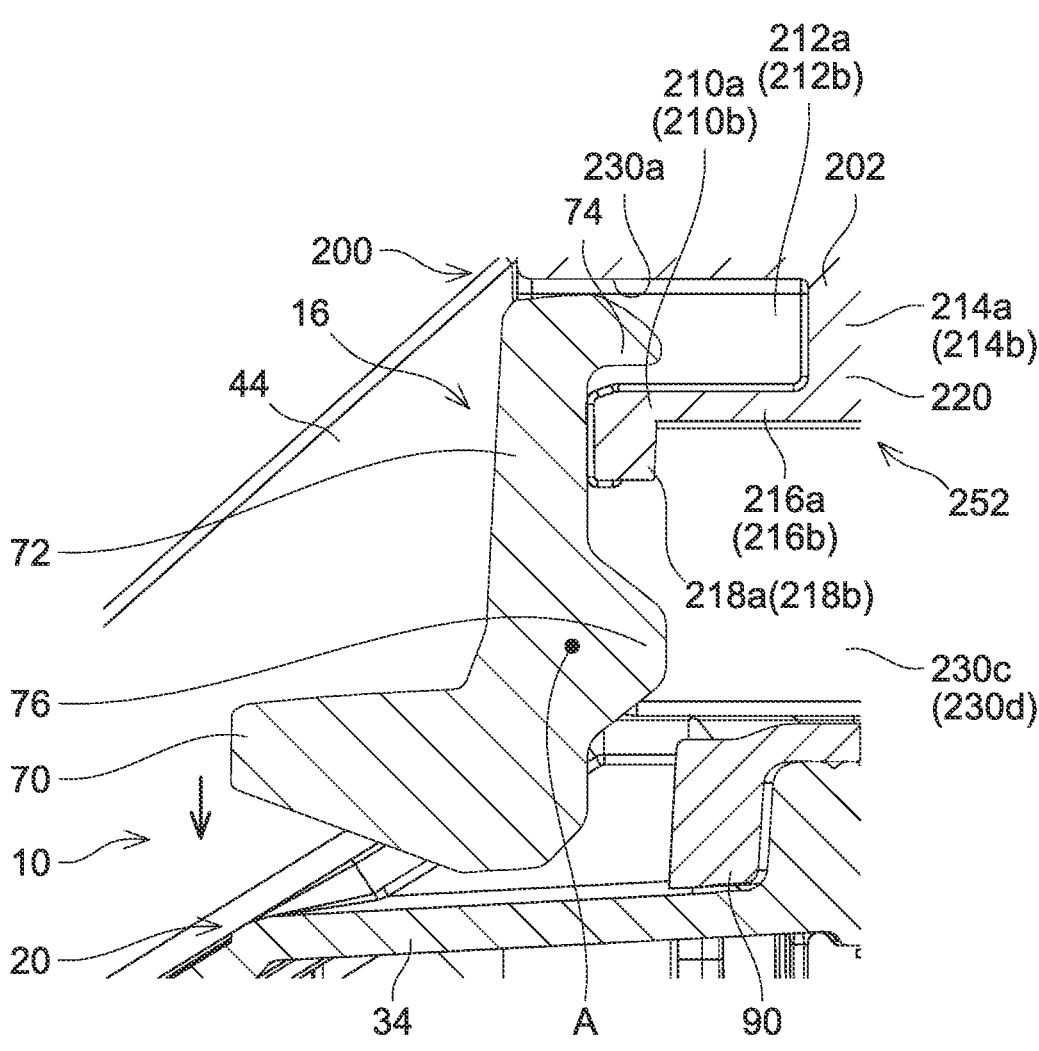
FIG. 14 is a cross-sectional view illustrating movement of the hook 16 of the first embodiment (3).
Figure 14:
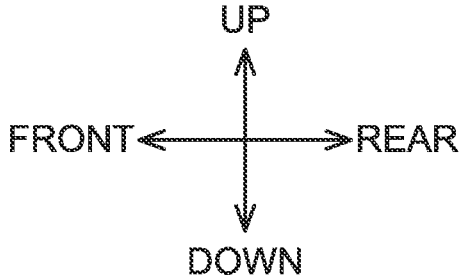

As illustrated in FIG. 14, when the upper end of the right extending portion 216a of the right engaging portion 210a and the upper end of the left extending portion 216b of the left engaging portion 210b of the battery pack 200 move downward beyond the engaging portions 74 of the hook 16 of the charger 10, the hook 16 rotates with the axis A as its rotation axis by biasing force of the spring 140. Specifically, the engaging portions 74 move rearward, and at the same time, the operation part 70 moves upward. Consequently, the engaging portions 74 of the charger 10 enter the right groove 212a and the left groove 212b of the battery pack 200. Under this state, even when the worker tries to move the battery pack 200 upward to detach the battery pack 200 from the charger 10, the upper end of the right extending portion 216a of the right engaging portion 210a and the upper end of the left extending portion 216b of the left engaging portion 210b of the battery pack 200 come into contact with the lower ends of the engaging portions 74, by which it is not possible to move the battery pack 200 upward. Thus, the state illustrated in FIG. 14 is a state in which the hook 16 is engaged with the right groove 212a and the left groove 212b of the battery pack 200 and the battery pack 200 is fixed to the charger 10. Hereafter, the position of the hook 16 when the battery pack 200 is fixed to the charger 10 may be referred to as a lock position. In this state, charging of the battery pack 200 is performed.

Figure 15:
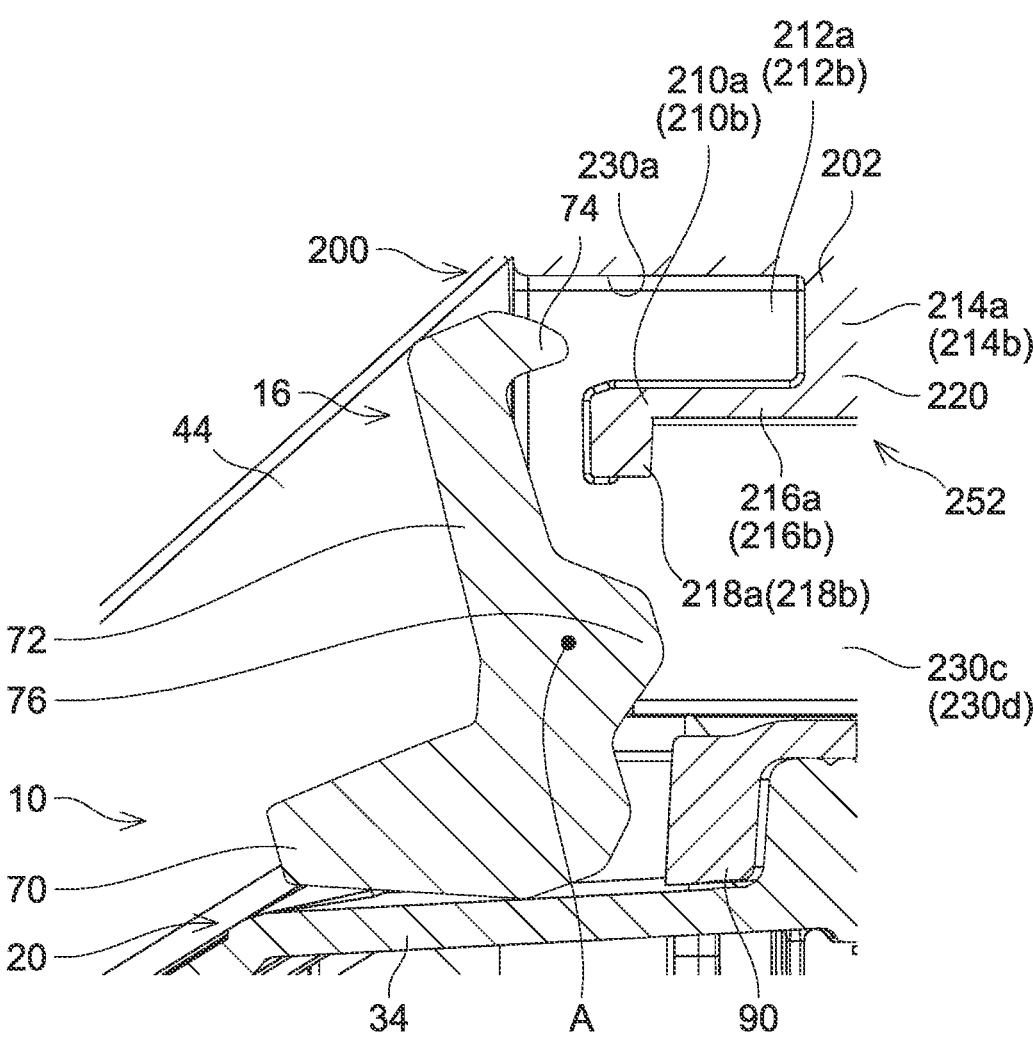
FIG. 15 is a cross-sectional view illustrating movement of the hook 16 of the first embodiment (4).
Figure 15:
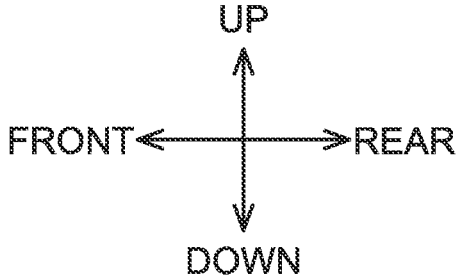

Then, when the charging of the battery pack 200 is completed, the worker detaches the battery pack 200 from the charger 10. Firstly, the worker presses down the operation part 70 of the hook 16. In this case, as illustrated in FIG. 15, the hook 16 rotates with the axis A as its rotation axis and the engaging portions 74 move forward. Consequently, the engaging portions 74 enter the state of not being disposed above the right extending portion 216a of the right engaging portion 210a and the left extending portion 216b of the left engaging portion 210b of the battery pack 200. Thus, the worker can move the battery pack 200 upward and detach the battery pack 200 from the charger 10. Hereafter, a position of the hook 16 when the battery pack 200 is not fixed to the charger 10 may be referred to as an unlock position. Then, the worker releases his/her hand from the operation part 70 of the hook 16 after detaching the battery pack 200 from the charger 10. In this case, as illustrated in FIG. 12, the hook 16 rotates with the axis A as its rotation axis by biasing force of the spring 140. Specifically, the engaging portions 74 move rearward, and at the same time, the operation part 70 moves upward and the position of the hook 16 is changed from the unlock position to the lock position.

As illustrated in FIG. 1 to FIG. 15, the charger 10 of one embodiment comprises the body case 12 and the hook 16 attached to the body case 12 and configured to engage with the right groove 212a and the left groove 212b of the battery pack 200. Further, as illustrated in FIG. 15, the battery pack 200 is fixed to the charger 10 by the hook 16 engaging with the right groove 212a and the left groove 212b. As illustrated in FIG. 14, the hook 16 engages with the right groove 212a and the left groove 212b defined in the vicinity of the battery-side terminals 242. By virtue of the right groove 212a and the left groove 212b being defined in the vicinity of the battery-side terminals 242, the battery-side terminals 242 are firmly fixed in the state where the battery pack 200 is fixed to the charger 10. Accordingly, it is possible to suppress adverse movement of the battery-side terminals 242 in the state where the battery pack 200 is fixed to the charger 10. Further, according to the above configuration, as compared to the configuration in which neither the right groove 212a nor the left groove 212b is defined in the vicinity of the battery-side terminals 242, the hook 16 can be downsized in the configuration in which the battery pack 200 and the charger 10 are fixed to each other using the hook 16. Consequently, the charger 10 can be downsized. Further, the structure of the hook 16 can be simplified.

As illustrated in FIG. 2, the charger 10 of one embodiment comprises the terminal unit 14 including the apparatus-side terminals 120 corresponding to the battery-side terminals 242, and the hook 16 is attached to the terminal unit 14 outside the body case 12. According to the aforementioned configuration, by virtue of the hook 16 being attached to the terminal unit 14 outside the body case 12, it is not necessary to define an opening in the body case 12 for the hook 16 to extend from within the body case 12 to the outside thereof. Accordingly, water can be suppressed from entering the charger 10.

As illustrated in FIG. 8, the charger 10 of one embodiment comprises the spring 140 disposed between the terminal unit 14 and the hook 16, and the spring 140 is configured to bias the hook 16 from the unlock position (see FIG. 15) to the lock position (see FIG. 14). Under the state where the hook 16 is positioned at the unlock position, the battery pack 200 is not fixed to the charger 10, and under the state where the hook 16 is positioned at the lock position, the battery pack 200 is fixed to the charger 10. According to the above configuration, after the battery pack 200 is attached to the charger 10, the state in which the battery pack 200 is fixed to the charger 10 is maintained without the worker's operation on the hook 16. Accordingly, worker convenience can be enhanced.

As illustrated in FIG. 8 and FIG. 9, in the charger 10 of one embodiment, the terminal unit 14 comprises the side protruding portions 96, 98 protruding in the left-right direction, and the hook 16 comprises the recesses 80 configured to slidably retain the side protruding portions 96, 98. The hook 16 is attached to the terminal unit 14 such that the hook 16 is rotatable about the axis A of the side protruding portions 96, 98. According to the aforementioned configuration, it is possible to change the state in which the battery pack 200 is fixed to the charger 10 and the state in which the battery pack 200 is not fixed to the charger 10 with a relatively simple configuration.

As illustrated in FIG. 2, FIG. 3 and FIG. 7, in the charger 10 of one embodiment, the body case 12 comprises the upper wall 20a to which the apparatus-side terminals 120 corresponding to the battery-side terminals are attached, the bottom wall 22a, and the standing portions 42 extending upward from the upper wall 20a. Each of the standing portions 42 includes the front rail 46a and the rear rail 46b extending in the sliding direction of the battery pack 200. As illustrated in FIG. 5, the upper ends of the standing portions 42 are positioned higher than the upper end of the hook 16. According to the above configuration, when the charger 10 falls in the state where the upper ends of the standing portions 42 and the upper end of the hook 16 are directed downward, the standing portions 42 come into contact with the ground. Thus, when the charger 10 falls, the hook 16 can be suppressed from coming into contact with the ground and getting damaged.

In one embodiment, as illustrated in FIG. 0.17 and FIG. 18, the battery pack 200 further includes the terminal cover 250 configured to be detachably attached to the housing 202. The housing 202 includes the lower surface 220a facing the charger 10 and the terminal IF portion 230 recessed inward than the lower surface 220a. The terminal IF portion 230 includes the battery-side terminals 242, the right groove 212a and the left groove 212b, and the cover attachment portion 252 for attaching the terminal cover 250 to the terminal IF portion 230. Under the state where the terminal cover 250 is not attached to the terminal IF portion 230 (FIG. 26), the battery pack 200 is fixed to the charger 10 by the hook 16 engaging with the right groove 212a and the left groove 212b defined in the terminal IF portion 230. According to the above configuration, as compared to the configuration in which one of the right groove 212a, the left groove 212b and the cover attachment portion 252 is not disposed at the terminal IF portion 230, the battery pack 200 can be downsized and the charger 10 to which the battery pack 200 is to attached can also be downsized.

In one embodiment, the terminal IF portion 230 comprises the IF upper surface 230a recessed inward than the lower surface 220a of the housing 202 and orthogonal to the sliding direction of the battery pack 200 (i.e., the up-down direction), and the IF right surface 230c and the IF left surface 230d extending in the sliding direction and connecting the lower surface 220a of the housing 202 and the IF upper surface 230a. The cover attachment portion 252 comprises the right extending portion 216a and the left extending portion 216b protruding into the terminal IF portion 230 from the IF right surface 230c and the IF left surface 230d. Each of the right groove 212a and the left groove 212b is defined between the IF upper surface 230a and corresponding one of the right extending portion 216a and the left extending portion 216b. According to the above configuration, the battery pack 200 can be fixed to the charger 10 by using the right groove 212a and the left groove 212b, and the terminal cover 250 can be attached to the housing 202 of the battery pack 200.

As illustrated in FIG. 1 to FIG. 26, the apparatus system 2 of one embodiment comprises the battery pack 200 and the charger 10 to which the battery pack 200 is to be detachably attached. The battery pack 200 comprises the battery-side terminals and the housing 202. The housing 202 includes the right groove 212a and the left groove 212b defined in the vicinity of the battery-side terminals. The charger 10 comprises: the body case 12; and the hook 16 attached to the body case 12 and configured to engage with the right groove 212a and the left groove 212b of the battery pack 200. The battery pack 200 is fixed to the charger 10 by the hook 16 engaging with the right groove 212a and the left groove 212b. According to the above configuration, by using the right groove 212a and the left groove 212b, the battery pack 200 can be fixed to the charger 10. Accordingly, the structure of the charger 10 can be simplified. Further, while the battery pack 200 is being charged, the battery pack 200 can be fixed to the charger 10.

In the apparatus system 2 of one embodiment, as illustrated in FIG. 17 and FIG. 18, the battery pack 200 further includes the terminal cover 250 configured to be detachably attached to the housing 202. The housing 202 includes the lower surface 220a facing the charger 10 and the terminal IF portion 230 recessed inward than the lower surface 220a. The terminal IF portion 230 includes the battery-side terminals 242, the right groove 212a and the left groove 212b, and the cover attachment portion 252. According to the above configuration, as compared to the configuration in which one of the right groove 212a, the left groove 212b and the cover attachment portion 252 is not disposed at the terminal IF portion 230, the battery pack 200 can be downsized and the charger 10 to which the battery pack 200 is to be attached can also be downsized.

In the apparatus system 2 of one embodiment, as illustrated in FIG. 17 and FIG. 18, the terminal IF portion 230 comprises the IF upper surface 230a recessed inward than the lower surface 220a of the housing 202 and orthogonal to the sliding direction of the battery pack 200 (i.e., the up-down direction), and the IF right surface 230c and the IF left surface 230d extending in the sliding direction and connecting the lower surface 220a of the housing 202 and the IF upper surface 230a. The cover attachment portion 252 comprises the right extending portion 216a and the left extending portion 216b protruding into the terminal IF portion 230 from the IF right surface 230c and the IF left surface 230d. Each of the right groove 212a and the left groove 212b is defined between the IF upper surface 230a and corresponding one of the right extending portion 216a and the left extending portion 216b. According to the above configuration, the battery pack 200 can be fixed to the charger 10 and the terminal cover 250 can be attached to the housing 202 of the battery pack 200 by using the right groove 212a and the left groove 212b.

(Corresponding Relationships)

The charger 10 is an example of "electrical apparatus". The spring 140 is an example of "biasing member". The side protruding portions 96, 98 are examples of "protruding portion". The lower surface 220a of the housing 202 is an example of "first housing surface". The IF upper surface 230a of the terminal IF portion 230 is an example of "first interface surface". The IF right surface 230c and the IF left surface 230d of the terminal IF portion 230 are examples of "second interface surface". The right extending portion 216a and the left extending portion 216b are examples of "second protruding portion".

Second Embodiment

Figure 27:
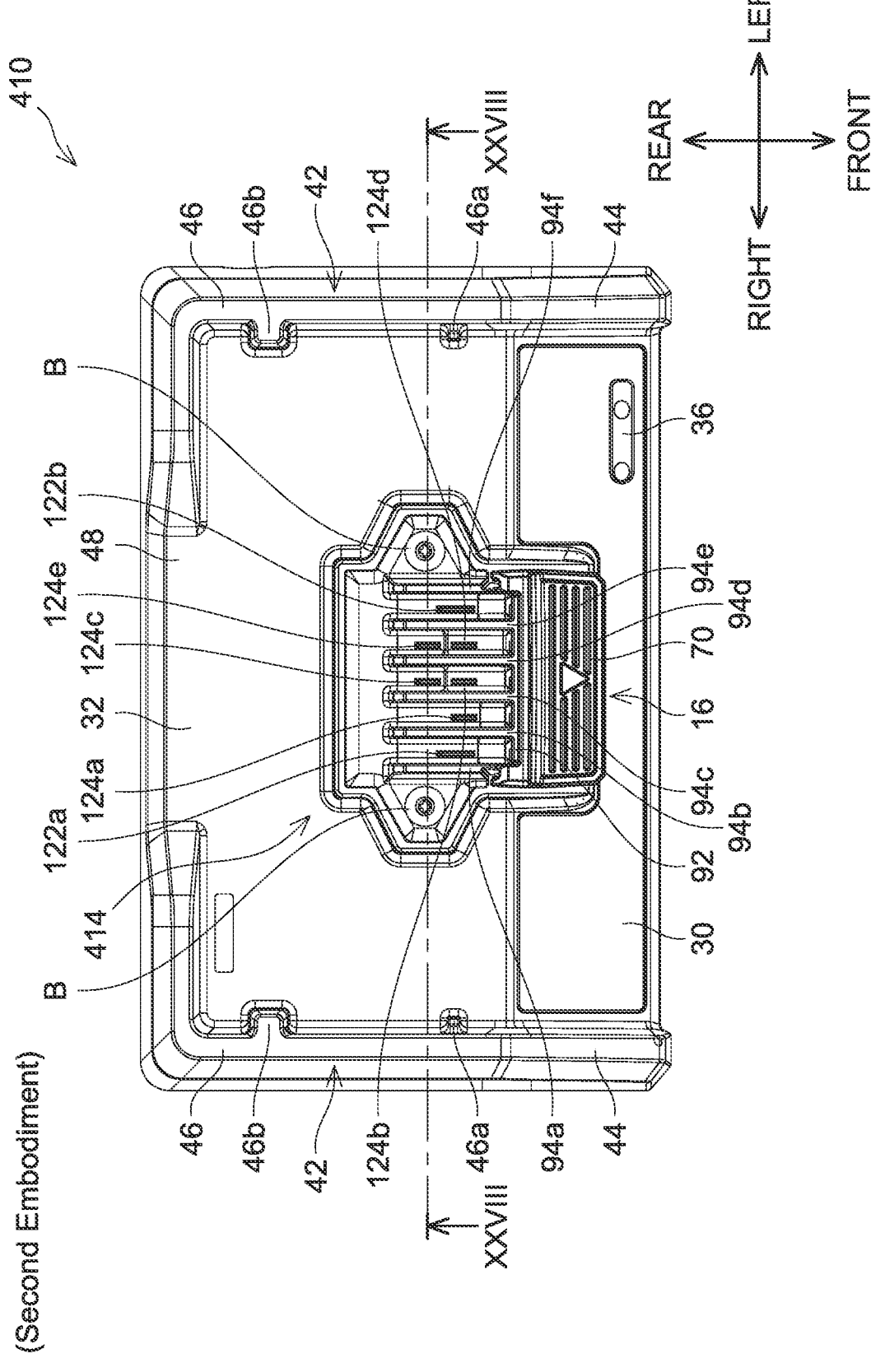
FIG. 27 is a top view of a charger 10 of a second embodiment viewed from above.
Figure 28:
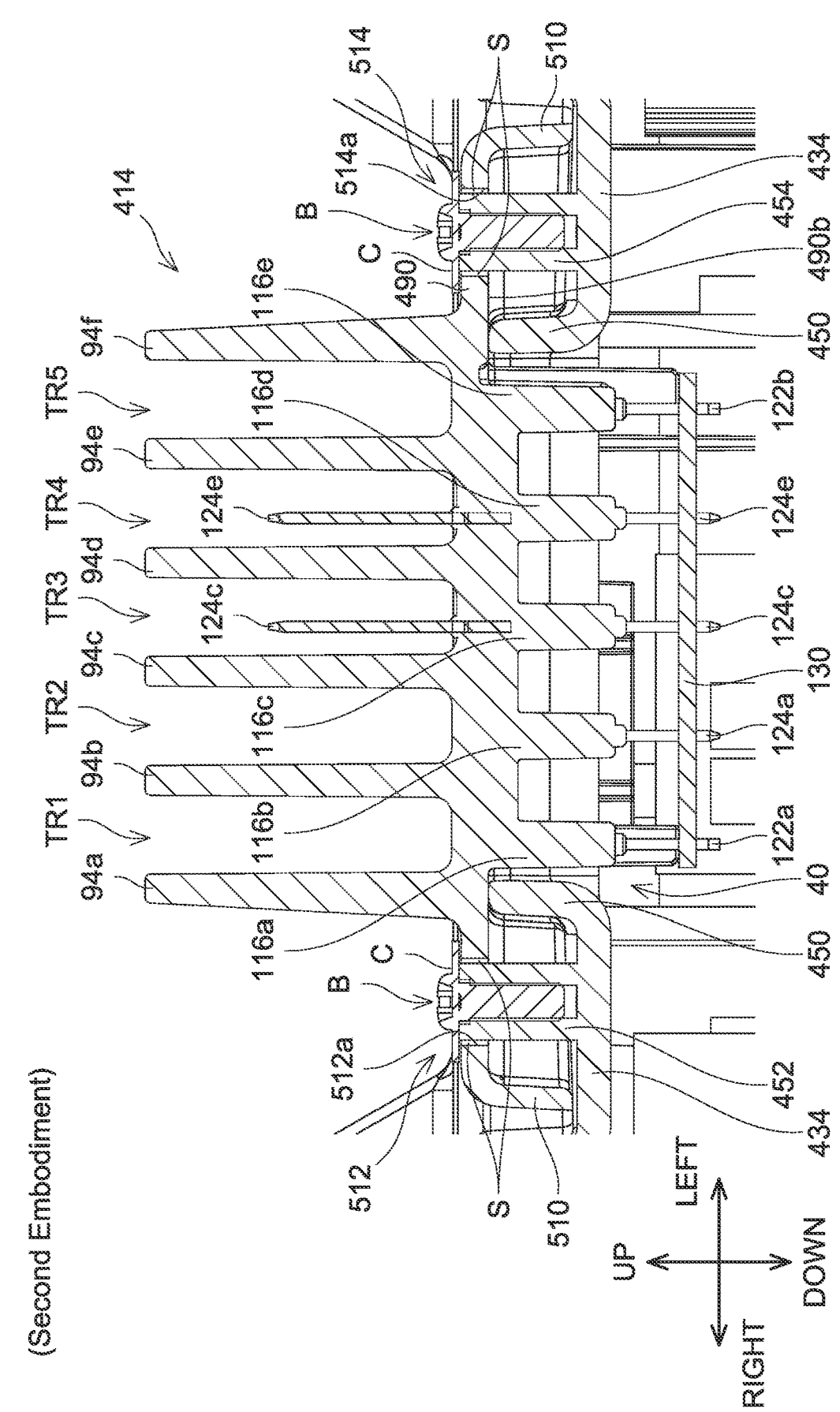
FIG. 28 is a cross-sectional view along a XXVIII-XXVIII line of FIG. 27.

With reference to FIG. 27 and FIG. 28, a charger 410 of the present embodiment will be described. The charger 410 of the present embodiment is different from the charger 10 of the first embodiment in structures of a terminal unit 414 and a center upper wall 434 of the body case 12. Hereafter, the same reference signs are given to the structures common between the embodiments, and explanation thereof will be omitted.

As illustrated in FIG. 28, the terminal unit 414 includes lower ribs 510 extending downward from a lower surface 490b of a base 490. An attachment portions 512 is disposed between the side rib 94a disposed on the rightmost side of the terminal unit 414 and the lower rib 510, and an attachment portion 514 is disposed between the side rib 94f disposed on the leftmost side of the terminal unit 414 and the lower rib 510. The attachment portions 512, 514 include through holes 512a, 514a penetrating the base 490 of the terminal unit 414 in the up-down direction.

An upper rib 450 extending upward from the upper surface of the center upper wall 434 is disposed around the opening 40. A boss portion 452 is disposed rightward of the upper rib 450 and the side rib 94a disposed on the rightmost side of the terminal unit 414, and a boss portion 454 is disposed leftward of the upper rib 450 and the side rib 94f disposed on the leftmost side of the terminal unit 414. The boss portions 452, 454 extend upward from the upper surface of the center upper wall 434. The boss portions 452, 454 are disposed at positions corresponding to attachment portions 512, 514 of the terminal unit 414. An outer diameter of each of the boss portions 452, 454 is smaller than a diameter of each of the through holes 512a, 514a of the attachment portions 512, 514. In the present embodiment, screws B including flanges C each having an outer diameter greater than a diameter of each of the through holes 512a, 514a are screwed into the boss portions 452, 454. The terminal unit 414 is clamped between the screws B and the body case 12, by which the terminal unit 414 is attached to the body case 12. Under the state where the terminal unit 414 is attached to the body case 12, spaces S are defined between the boss portions 452, 454 and the attachment portions 512, 514 in the left-right direction. Thus, the terminal unit 414 can slightly move in the horizontal direction with respect to the body case 12. With such a configuration as well, the same effect provided by the charger 10 of the first embodiment can be achieved.

Additional features of the battery pack disclosed herein are listed below.

(Feature 1)

An electrical apparatus to which a battery pack is to be detachably attached, the battery pack comprising:

a body case; and a plurality of terminals disposed on the body case, wherein the body case includes a first upper wall on which the plurality of terminals is disposed, the plurality of terminals includes a first terminal and a second terminal adjacent to each other in a first direction, and a step portion for changing a height of a first portion at which the first terminal is disposed and a height of a second portion at which the second terminal is disposed is disposed on an upper surface of the first upper wall between the first terminal and the second terminal.

(Feature 2)

The electrical apparatus according to feature 1, wherein on the upper surface, the first portion inclines such that a first terminal side is located lower than a step portion side, and the second portion inclines such that a second terminal side is located lower than a step portion side.

(Feature 3)

The electrical apparatus according to feature 1, wherein the plurality of terminals further includes a third terminal adjacent to the first terminal in a second direction orthogonal to the first direction, and a first rib extending upward from the upper surface between the first terminal and the third terminal is disposed on the upper surface.

(Feature 4)

The electrical apparatus according to feature 3, wherein the first terminal and the second terminal are terminals used for communication of a signal, the third terminal is a terminal used for charging and discharging, the electrical apparatus further comprises a second rib extending upward from the upper surface and disposed opposite to the first rib with respect to the third terminal in the second direction, when viewed in the second direction, a size of each of the first rib and the second rib is greater than a size of the third terminal, a distance between the first rib and the second rib in the second direction is smaller than a predetermined distance, and the predetermined distance is an interval which does not allow a finger of an worker to contact the third terminal even when the finger of the worker enters between the first rib and the second rib.

(Feature 5)

The electric apparatus according to feature 3 or 4, further comprising a third rib extending upward from the upper surface and disposed opposite to the first rib with respect to the first terminal in the second direction; and a connecting rib extending upward from the upper surface and connecting the first rib and the third rib on a side opposite to the step portion with respect to the first terminal in the first direction.

(Feature 6)

The electrical apparatus according to feature 5, wherein a drain hole is defined between the step portion and the connecting rib.

(Feature 7)

The electrical apparatus according to feature 6, wherein the drain hole is closer to the connecting rib than the first terminal is.

(Feature 8)

The electrical apparatus according to feature 7, wherein the body case further includes a second upper wall which partially overlaps the first upper wall when viewed from above and is located lower than the first upper wall, a fourth rib extending upward from an upper surface of the second upper wall and being in contact with a lower surface of the first upper wall is disposed, a fifth rib extending downward from the lower surface and being in contact with the upper surface of the second upper wall is disposed on the lower surface of the first upper wall, and the drain hole is closer to the connection rib than the fourth rib and the fifth rib are.

While specific examples of the present disclosure have been described above in detail, these examples are merely illustrative and place no limitation on the scope of the patent claims. The technology described in the patent claims also encompasses various changes and modifications to the specific examples described above.

(First Variant) The hook 16 may be attached to the terminal unit 14 inside the body case 12.

(Second Variant) The spring 140 may not be disposed between the terminal unit 14 and the hook 16. In the present variant, the worker operates the hook 16, by which the unlock position and the lock position are changed.

(Third Variant) The hook 16 may include protruding portions protruding in the left-right direction and the terminal unit 14 may include recesses slidably retaining the protruding portions.

(Fourth Variant) The hook 16 may be attached such that it is movable in the front-rear direction with respect to the terminal unit 14.

(Fifth Variant) The upper end of the hook 16 may be located higher than the upper ends of the standing portions 42.

(Sixth Variant) The "electrical apparatus" is not limited to the charger 10, and may be a working machine such as a lawnmower.

(Seventh Variant) The cover attachment portion 252 may be disposed at a position different from the terminal IF portion 230. In the present variant, second protruding portions for defining grooves to which the engaging portions 74 of the hook 16 are to engage are disposed in the terminal IF portion 230. These grooves are not used to attach the terminal cover 250 to the battery pack 200.

(Eighth Variant) Grooves to which the engaging portions 74 of the hook 16 are to engage may be disposed in the terminal IF 30 in addition to the right groove 212a and the left groove 212b. For example, "second protruding portions" for defining grooves to which the engaging portions 74 of the hook 16 are to engage may be disposed above or below the right engaging portion 210a and the left engaging portion 210b.

The technical elements explained in the present description or drawings provide technical utility either independently or through various combinations. The present disclosure is not limited to the combinations recited in the claims as originally filed. Further, the purpose of the examples illustrated by the present description or drawings is to satisfy multiple objectives simultaneously, and satisfying any one of those objectives gives technical utility to the present disclosure.

The invention claimed is:

1. An electrical apparatus to which a battery pack is to be detachably attached, the battery pack including a battery-side terminal and a housing, wherein the housing includes a groove defined in a vicinity of the battery-side terminal, the electrical apparatus comprising:

a body case;

a terminal unit including an apparatus-side terminal corresponding to the battery-side terminal and attached to the body case; and a hook rotatably attached to the terminal unit and configured to engage with the groove of the battery pack, wherein:

the hook includes a rotatable operation portion configured to be operated by a worker, the battery pack is fixed to the electrical apparatus by the hook engaging with the groove, one of the terminal unit and the hook comprises a protruding portion protruding in an axial direction, the other of the terminal unit and the hook comprises a recess configured to slidably retain the protruding portion, and the hook is attached to the terminal unit such that the hook is rotatable about an axis of the protruding portion.

2. The electrical apparatus according to claim 1, wherein the hook is rotatably attached to the terminal unit outside the body case.

3. The electrical apparatus according to claim 2, further comprising a biasing member disposed between the terminal unit and the hook, wherein the biasing member is configured to bias the hook from an unlock position to a lock position, wherein under a state where the hook is positioned in the unlock position, the battery pack is not fixed to the electrical apparatus, and under a state where hook is positioned in the lock position, the battery pack is fixed to the electrical apparatus.

4. The electrical apparatus according to claim 1, wherein the body case comprises an upper wall to which the apparatus-side terminal is attached, a bottom wall, and a standing portion extending upward from the upper wall, wherein the standing portion includes a rail extending in a sliding direction of the battery pack, and an upper end of the standing portion is positioned higher than an upper end of the hook.

5. The electrical apparatus according to claim 4, wherein the standing portion is disposed at each side end in a first direction orthogonal to the sliding direction.

6. The electrical apparatus according to claim 1, wherein the electrical apparatus is a charger.

7. The electrical apparatus according to claim 1, wherein the terminal unit comprises the protruding portion, and the hook comprises the recess.

8. An electrical apparatus to which a battery pack is to be detachably attached, the battery pack including a battery-side terminal and a housing, wherein the housing includes a groove defined in a vicinity of the battery-side terminal, the electrical apparatus comprising:

a body case;

a terminal unit including an apparatus-side terminal corresponding to the battery-side terminal and attached to the body case; and a hook rotatably attached to the terminal unit and configured to engage with the groove of the battery pack, wherein:

the hook includes a rotatable operation portion configured to be operated by a worker, the battery pack is fixed to the electrical apparatus by the hook engaging with the groove, the battery pack further includes a terminal cover configured to be detachably attached to the housing, the housing includes a first housing surface facing the electrical apparatus and a terminal interface portion recessed inward than the first housing surface, the terminal interface portion includes the battery-side terminal, the groove and a cover attachment portion for attaching the terminal cover to the terminal interface portion, wherein under a state where the terminal cover is not attached to the terminal interface portion, the battery pack is fixed to the electrical apparatus by the hook engaging with the groove defined in the terminal interface portion.

9. The electrical apparatus according to claim 8, wherein the terminal interface portion comprises a first interface surface recessed inward than the first housing surface and orthogonal to a sliding direction of the battery pack, and a second interface surface extending in the sliding direction and connecting the first housing surface and the first interface surface, the cover attachment portion comprises a second protruding portion protruding into the terminal interface portion from the second interface surface, and the groove is defined between the second protruding portion and the first interface surface.

10. The electrical apparatus according to claim 8, wherein the hook is rotatably attached to the terminal unit outside the body case.

11. The electrical apparatus according to claim 10, further comprising a biasing member disposed between the terminal unit and the hook, wherein:

the biasing member is configured to bias the hook from an unlock position to a lock position, under a state where the hook is positioned in the unlock position, the battery pack is not fixed to the electrical apparatus, and under a state where the hook is positioned in the lock position, the battery pack is fixed to the electrical apparatus.

12. The electrical apparatus according to claim 8, wherein:

the body case comprises an upper wall to which the apparatus-side terminal is attached, a bottom wall, and a standing portion extending upward from the upper wall, the standing portion includes a rail extending in a sliding direction of the battery pack, and an upper end of the standing portion is positioned higher than an upper end of the hook.

13. The electrical apparatus according to claim 12, wherein the standing portion is disposed at each side end in a first direction orthogonal to the sliding direction.

14. The electrical apparatus according to claim 8, wherein the electrical apparatus is a charger.

15. An apparatus system comprising:

a battery pack and an electrical apparatus to which the battery pack is to be detachably attached, the battery pack comprises:

a battery-side terminal; and a housing, wherein the housing includes a groove defined in a vicinity of the battery side terminal, the electrical apparatus comprises:

a body case;

a terminal unit including an apparatus-side terminal corresponding to the battery-side terminal and attached to the body case; and a hook rotatably attached to the terminal unit and configured to engage with the groove of the battery pack, wherein:

the hook includes a rotatable operation portion configured to be operated by a worker, the battery pack is fixed to the electrical apparatus by the hook engaging with the groove, one of the terminal unit and the hook comprises a protruding portion protruding in an axial direction, the other of the terminal unit and the book comprises a recess configured to slidably retain the protruding portion, and the hook is attached to the terminal unit such that the hook is rotatable about an axis of the protruding portion.

16. The apparatus system according to claim 15, wherein the battery pack further comprises:

a terminal cover configured to be detachably attached to the housing, the housing comprises a first housing surface facing the electrical apparatus and a terminal interface portion recessed inward than the first housing surface, and the terminal interface portion includes the battery-side terminal, the groove and a cover attachment portion for attaching the terminal cover to the terminal interface portion.

17. An apparatus system comprising a battery pack and an electrical apparatus to which the battery pack is to be detachably attached, the battery pack comprise:

a battery-side terminal; and a housing, wherein the housing includes a groove defined in a vicinity of the battery side terminal, the electrical apparatus comprises:

a body case;

a terminal unit including an apparatus-side terminal corresponding to the battery-side terminal and attached to the body case; and a book rotatably attached to the terminal unit and configured to engage with the groove of the battery pack, wherein:

the book includes a rotatable operation portion configured to be operated by a worker, the battery pack is fixed to the electrical apparatus by the hook engaging with the groove, the battery pack further comprises:

a terminal cover configured to be detachably attached to the housing, the housing comprises a first housing surface facing the electrical apparatus and a terminal interface portion recessed inward than the first housing surface, the terminal interface portion includes the battery-side terminal, the groove and a cover attachment portion for attaching the terminal cover to the terminal interface portion, the terminal interface portion comprises a first interface surface recessed inward than the first housing surface and orthogonal to a sliding direction of the battery pack, and a second interface surface extending in the sliding direction and connecting the first housing surface and the first interface surface, the cover attachment portion comprises a second protruding portion protruding into the terminal interface portion from the second interface surface, and the groove is defined between the second protruding portion and the first interface surface.

18. An electrical apparatus to which a battery pack is to be detachably attached, the battery pack including a battery-side terminal and a housing, wherein the housing includes a groove defined in a vicinity of the battery-side terminal, the electrical apparatus comprising:

a body case;

a terminal unit including an apparatus-side terminal corresponding to the battery-side terminal and attached to the body case; and a hook rotatably attached to the terminal unit and configured to engage with the groove of the battery pack, wherein:

the hook includes a rotatable operation portion configured to be operated by worker, the battery pack is fixed to the electrical apparatus by the hook engaging with the groove, the hook further comprises a wall extending in a sliding direction of the battery pack from a first end of the operation portion and at least one engaging portion disposed at a second end of the wall, the first end is an end in a second direction orthogonal to the sliding direction, and the second end is an end in the sliding direction and opposite to the operation portion.

19. The electrical apparatus according to claim 18, wherein the at least one engaging portion includes two engaging portions, the hook further comprises the two engaging portions, one of the two engaging portions is disposed at an end in a third direction orthogonal to the sliding direction and the second direction, and the other of the two engaging portions is disposed at an opposite end in the third direction.

\* \* \* \* \*